(12) United States Patent
Miyashita et al.

(10) Patent No.: US 6,735,160 B1
(45) Date of Patent: May 11, 2004

(54) OPTICAL DISC, AND RECORDING APPARATUS, RECORDING METHOD, AND REPRODUCING APPARATUS FOR THE SAME

(75) Inventors: Harumitsu Miyashita, Minoo (JP); Hiromichi Ishibashi, Ibaraki (JP); Shinichi Tanaka, Kyotanabe (JP); Takashi Yumiba, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 700 days.

(21) Appl. No.: 09/609,317

(22) Filed: Jun. 30, 2000

(30) Foreign Application Priority Data

| Jul. 7, 1999 | (JP) | ............................................ 11-192760 |
| Jul. 15, 1999 | (JP) | ............................................ 11-201382 |
| Apr. 11, 2000 | (JP) | ...................................... 2000-109602 |

(51) Int. Cl.$^7$ ................................................. G11B 7/00
(52) U.S. Cl. ............................... 369/59.12; 369/59.25; 369/275.3
(58) Field of Search ......................... 369/44.27, 44.28, 369/44.31, 44.43, 275.3, 275.4, 53.16, 53.2, 53.31, 47.19, 47.28, 59.11, 59.12, 124.04, 124.14, 59.2, 59.25

(56) References Cited

U.S. PATENT DOCUMENTS

| 4,416,002 A | * | 11/1983 | Oguino et al. | ............ 369/44.27 |
| 5,199,023 A | * | 3/1993 | Yamamoto et al. | ...... 369/275.4 |
| 5,272,686 A | * | 12/1993 | Shigemori | ................ 369/44.26 |
| 5,572,507 A | * | 11/1996 | Ozaki et al. | ............. 369/53.21 |

FOREIGN PATENT DOCUMENTS

JP    11-39721    2/1999

OTHER PUBLICATIONS

"Standard Interface for DVD–ROM Devices Takes Shape Procedure for Securely Exchanging Encryption Keys is Stipulated"; Nikkei Electronics, Nov. 18, 1996, pp. 13 and 14 (with English translation pp 1–4).

* cited by examiner

*Primary Examiner*—Thang V. Tran
*Assistant Examiner*—Bach Vuong
(74) *Attorney, Agent, or Firm*—Wenderoth, Lind & Ponack, L.L.P.

(57) ABSTRACT

An optical disc recording apparatus records a digital content onto an optical disc so that the perfect copying of the digital content is difficult without proper authorization. The optical disc recording apparatus includes a formatter for generating a channel signal corresponding to primary digital information, a secret key storing unit for prestoring secondary digital information, a pseudo random number generator for generating a pseudo random number series, an XOR for logically inverting the pseudo random number series according to each bit of the secondary digital information, a PE modulator for generating a PE modulation signal according to the logically inverted pseudo random number series, a phase modulator for modulating the phase of each edge of the channel signal by a fixed slight time according to the value of the PE modulation signal, and a recording channel for forming recording marks on a DVD according to the modulated channel signal.

25 Claims, 29 Drawing Sheets

OPTICAL DISC, AND RECORDING APPARATUS, RECORDING METHOD, AND REPRODUCING APPARATUS FOR THE SAME

This application is based on application No. 2000-185374 filed in Japan, the content of which is hereby incorporated by reference.

BACKGROUND OF THE INVENTION

1. Field of the Invention

The present invention relates to an optical disc, and a recording apparatus, a recording method and a reproducing apparatus for the optical disc. More particularly, the present invention relates to a technique for recording primary digital information and secondary digital information onto an optical disc by embedding the secondary digital information into the primary digital information.

2. Background Art

In recent years, optical discs typified by DVDs (Digital Versatile/Video Discs) have been commonly used as media for recording lengthy digital data such as AV (Audio and Visual) data and computer data. For instance, DVD-ROMs which can record upwards of two hours of high-quality moving pictures are already on the market. Techniques for preventing the unauthorized copying of digital contents of recording media like DVDs are required to support secure distribution of the digital contents.

The following description concerns a conventional technique (called a "content encryption method") for preventing such unauthorized copying (see Nikkei Electronics, Nov. 18, 1996, pages 13–14).

The content encryption method is described below with reference to FIG. 1, which shows ordinary recording areas on a DVD. According to this method, a compressed digital content, such as a movie, is encrypted by using secret keys on three hierarchical levels (a title key, a disc key, and a master key), and the encrypted content is recorded into a user information area 9a which can be accessed by a user. The master key is the most important of these keys and is provided only to authorized (licensed) manufacturers of DVD devices. The disc and title keys, which need to be assigned to a DVD and a title, respectively, are encrypted by using the master key and are stored in a control information area (read-in area) 9b which the user cannot access.

The above-described arrangement prevents an unauthorized (unlicensed) DVD reproducing apparatus from decoding encrypted contents. As a result, illegal activities, such as the mass production and retailing of DVDs that store unencrypted digital contents, can be prevented.

Japanese Laid-Open Patent Application No. H11-39721 discloses another technique for preventing the illegal copying of digital contents. According to this technique, copyguard information, which is produced by performing an FM modulation on a reference clock, is confidentially recorded onto an optical disc.

These conventional techniques, however, cannot stop DVD piracy. The unauthorized copying of a DVD can be easily performed, for instance, by bringing two spindle motors into perfect synchronization, placing an original DVD and another DVD on these spindle motors, generating a bit stream by reproducing a data string that is read from the original DVD and synchronizing the data string by using a PLL, and recording the bit stream onto the other DVD as it is.

In this manner, the digital content of a DVD can be copied to another DVD along with the copyguard information or information that is stored in the control information area. The encrypted content of a DVD that is illegally produced in this manner can then be read and decrypted by a licensed DVD device as if it were a genuine disc.

While the above-described techniques prevent the illegal production of DVDs that store unencrypted contents, the illegal activities of when encrypted contents recorded on DVDs are copied to other DVDs as they are cannot be stopped. This means that there is the risk of low-price pirated DVDs which may appear on the market and which may cause extensive commercial damage to the copyright owners of the contents.

SUMMARY OF THE INVENTION

The object of the present invention is therefore to provide an optical disc on which digital content is recorded in a manner that prevents the perfect copying of the digital content, and a recording apparatus, a recording method, and a reproducing apparatus for the optical disc.

The stated object is achieved by an optical disc on which primary digital information and secondary digital information are recorded, where the primary digital information is recorded as pits that are formed at discrete reference positions on a track, and the secondary digital information is recorded as deviations of slight amounts in the positions of certain pits from corresponding reference positions.

With this construction, the secondary digital information is embedded into the primary digital information so that the reading of the secondary digital information is difficult. Therefore, even if information on the optical disc is copied to another optical disc according to the presence or absence of the pits, the secondary digital information cannot be copied. This allows the original optical disc to be distinguished from the duplicated optical disc and thereby prevents copyright infringements caused by illegally copying the digital contents of the optical disc.

Here, each slight amount may be within a range where pits on an optical disc, on which only the primary digital information is recorded, deviate from corresponding reference positions during reproduction. This makes it extremely difficult for an ordinary reproducing apparatus to detect the secondary digital information that is hidden within jitter or radial errors. As a result, the dubbing of the secondary digital information together with the primary digital information can be prevented.

Here, the secondary digital information may be recorded with phase modulation where edges that determine the lengths of the certain pits in a track direction are formed at positions whose phases are advanced and delayed by the slight amounts from corresponding positions when the certain pits are formed to record only the primary digital information, and each slight amount may be constant and be within a range of jitter that is observed, during reproduction, for pits on an optical disc on which only the primary digital information is recorded.

Also, the secondary digital information may be recorded with a radial modulation where each certain pit is formed at a position that is displaced by a slight amount from a track center either inward or outward in a radial direction, and each slight amount may be constant and be within a range of position errors in the radial direction that are observed, during reproduction, for pits on an optical disc on which only the primary digital information is recorded.

The optical disc of the present invention into which the secondary digital information has been embedded can be produced by controlling the generation of delays, by a constant delay time, in the channel signal corresponding to the pit string during the jitter modulation. Also, the optical disc of the present invention can be produced by controlling the displacement of the recording head in the radial direction by the slight amount during the radial modulation. This simplifies the construction of a phase modulation circuit for performing the jitter modulation or the radial modulation.

Here, the secondary digital information may be recorded in a certain area of the optical disc, and within the certain area of the optical disc, a total number of edges formed at positions whose phases are advanced may be substantially equal to a total number of edges formed at positions whose phases are delayed. Also, within the certain area, a total number of pits that are formed at positions displaced inward may be substantially equal to a total number of pits that are formed at positions displaced outward.

As a result, in the case of the jitter modulation, the numbers of the advanced phase components and the numbers of the delayed phase components included in the channel signal that is subjected to the phase modulation to record the secondary digital information are substantially equal to each other. As a result, during reproduction, the channel bit clock that is synchronized with the channel signal is extracted with stability, and the sensitivity for detecting the phase modulation components is thereby enhanced. Similarly, in the case of the radial modulation, the number of inner displacements is substantially equal to the number of outer displacements. As a result, during reproduction, a push-pull signal is detected a modulation for with stability, a tracking servo is driven without an offset, and the sensitivity for detecting radial modulation components is thereby enhanced.

Here, within the certain area, advancing phases and a modulation for delaying phases may be performed with equal probability for each unit code of the primary digital information. Also, within the certain area, a modulation for displacing pits inward and a modulation for displacing pits outward may be performed with equal probability for each unit code of the primary digital information.

In the case of the jitter modulation, advanced edges and delayed edges of the channel signal are cyclically detected at short intervals during reproduction. As a result, the channel bit clock is extracted with stability and the secondary digital information is reconstructed with high accuracy. Similarly, in the case of the radial modulation, the channel signal that is displaced toward the inner periphery and the channel signal that is displaced toward the outer periphery are cyclically detected at short intervals during reproduction. As a result, the push-pull signal is detected with stability, the tracking servo is driven without an offset, and the secondary digital information is thereby reconstructed with high accuracy.

The stated object is also achieved by a recording apparatus for recording primary digital information and secondary digital information onto an optical disc by embedding the secondary digital information into the primary digital information. The recording apparatus includes: a primary digital information recording unit for recording the primary digital information by forming pits at discrete reference positions on a track of the optical disc, and secondary digital information recording unit for recording the secondary digital information by displacing positions of certain pits by slight amounts from corresponding reference positions. Here, the secondary digital information recording unit may further include a random number generating unit for generating a random number series, and a logic conversion unit for logically converting the random number series according to the secondary digital information, where the PE modulation unit generates the PE modulation signal according to the logically converted random number series.

With this construction, in the case of the jitter modulation, the edge positions of pits are subjected to the jitter modulation according to the random number series. This makes it difficult to decode the secondary digital information hidden within jitter. Similarly, in the case of the radial modulation, the recording positions of pits are subjected to the radial modulation according to the random number series. This makes it difficult to decode the secondary digital information hidden within jitter.

Here, the secondary digital information recording unit may further include a secondary digital information holding unit for secretly holding the secondary digital information, and the logic conversion unit may sequentially calculate an exclusive OR of a value of each bit composing the secondary digital information in the secondary digital information recording unit and each part having a constant length of the random number series. With this construction, the random number series is not embedded as it is, but a plurality of random number series generated by calculating exclusive-ORs of the random number series and secret information are embedded. This makes it more difficult to decode the secondary digital information.

The stated object is further achieved by a reproducing apparatus for an optical disc that records primary digital information and secondary digital information. Such a reproducing apparatus includes a primary digital information reproducing unit for reproducing the primary digital information by detecting pits formed at discrete reference positions on a track of the optical disc; a clock extracting unit for extracting a channel bit clock that is synchronized with the reference positions from a channel signal corresponding to a string of the detected pits, and a secondary digital information extracting unit for extracting the secondary digital information according to phase differences between the channel signal and the channel bit clock.

The stated object is also achieved by a reproducing apparatus for an optical disc that records primary digital information and secondary digital information. Such a reproducing includes a primary digital information reproducing unit for reproducing the primary digital information by detecting pits that are formed at discrete reference positions on a track of the optical disc, a radial error detecting unit for detecting a displacement of a position of each detected pit from a center of the track in a radial direction, and a secondary digital information extracting unit for extracting the secondary digital information according to the detected displacements.

Here, the reproducing apparatus may further include a reproduction restricting unit for restricting a reproduction of the primary digital information if the secondary digital information generating unit determines that each integral that is calculated by the integrating unit does not exceed the predetermined threshold value.

Also, the secondary digital information generating unit may determine whether a first correlation, a second correlation, or no correlation exists for each integral that is calculated by the integrating unit and, if either the first correlation or second correlation exists for each integral, the secondary digital generation unit outputs the existing correlations as the secondary digital information, where the first correlation means that an integral is greater than a predetermined position threshold value, and the second correlation means that an integral is smaller than a predetermined negative threshold value. The reproducing apparatus may further include a secret information storing unit for storing secret information, and a verification unit for comparing the secret information and the secondary digital information that is outputted from the secondary digital information generating unit, where the reproduction restricting unit may also restrict the reproduction of the primary digital information if the verification unit determines that the secret information does not match the secondary digital information.

This realizes an optical disc reproducing apparatus having a function of protecting copyrights by reading the secondary digital information that is embedded with the jitter modulation and the radial modulation.

Here, the primary digital information may be an information pit string that is formed in synchronization with a predetermined reference clock, and the secondary digital information may be copyguard-information represented by a pit string that is formed by locally adding phase errors to the predetermined reference clock.

With this construction, during recording, the reference clock is subjected to a phase modulation in response to the copyguard information, and the data string is recorded according to the phase-modulated clock. As a result, the duplication of the optical disc is difficult. During reproduction, the copyguard information is detected by detecting jitter values as phase shift components. This makes it possible to identify illegally duplicated optical discs by using an apparatus having a simple circuit construction.

The present invention may be realized as a recording method and a reproducing method that include steps for achieving the functions of the characteristic construction elements of the optical disc recording apparatus and the optical disc reproducing apparatus.

With the jitter modulation and the radial modulation of the present invention, illegal activities caused by dubbing optical discs storing digital contents are prevented, and a secure distribution of the digital contents is realized. Therefore, the present invention has a great practical use.

BRIEF DESCRIPTION OF THE DRAWINGS

These and other objects, advantages and features of the invention will become apparent from the following description when taken in conjunction with the accompanying drawings which illustrate a specific embodiment of the invention. In the drawings.

DETAILED DESCRIPTION OF THE INVENTION

First Embodiment

The first embodiment of the present invention is described below with reference to the drawings.

Optical Disc Recording Apparatus

Figure 2:
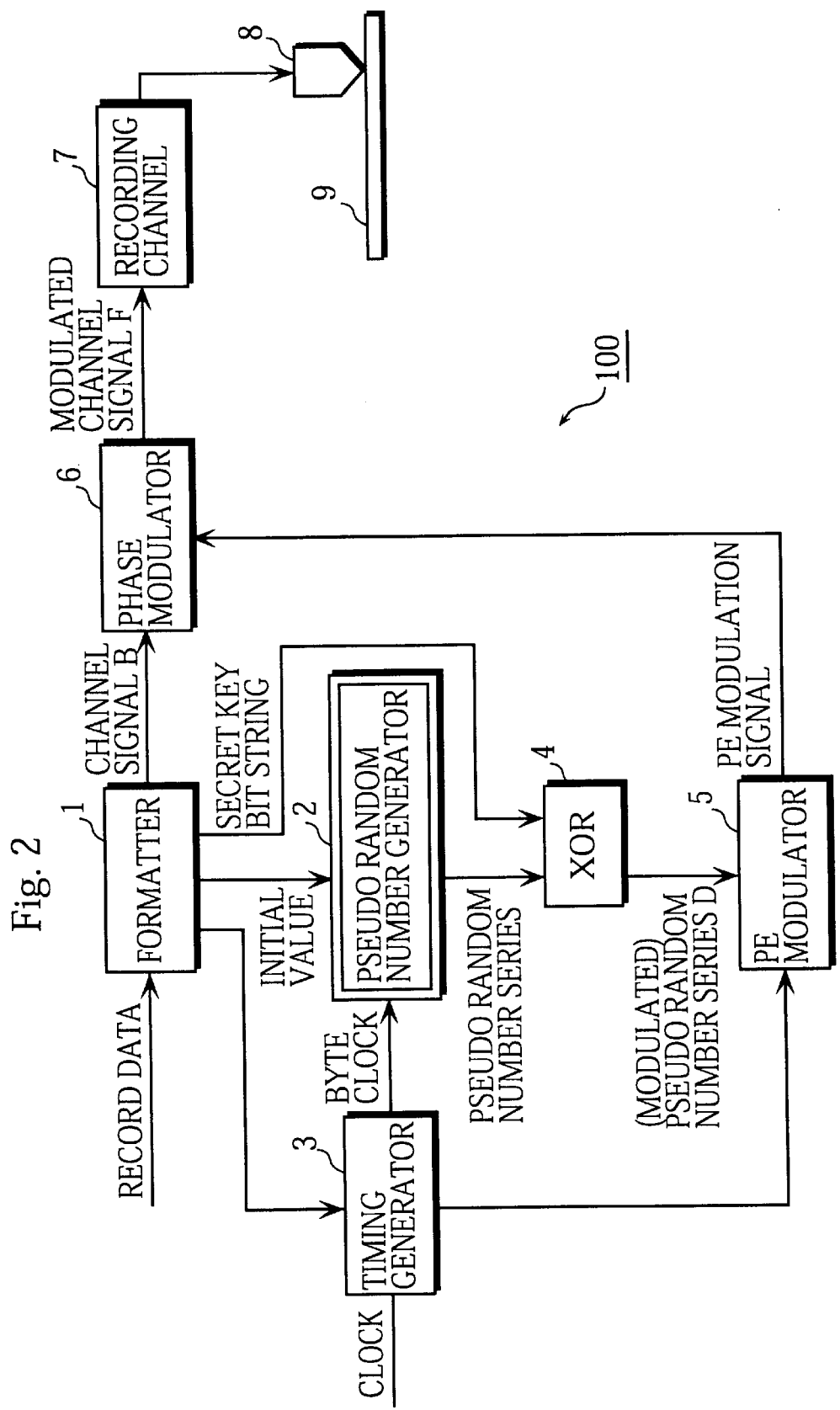
FIG. 2 is a block diagram showing the construction of an optical disc recording apparatus of a first embodiment of the present invention.

FIG. 2 is a block diagram showing the construction of the characteristic parts of an optical disc recording apparatus 100 of the first embodiment. Note that the waveforms of main signals B, D, E and F in FIG. 2 are shown in the timing chart in FIG. 3. Also, the double rectangle enclosing a block in FIG. 2 means that the construction elements of the block are confidentially mounted so as to prevent analysis of the internal construction of such a block. For instance, the construction elements are achieved by circuits confined within one LSI.

The optical disc recording apparatus 100 is a DVD-ROM recording apparatus and has a unique function. That is, the optical disc recording apparatus 100 not only records primary digital information by forming recording marks at discrete reference positions on the track of an optical disc, but the optical recording apparatus 100 also embeds hidden information, such as watermarks (a 56-bit secret key, in this first embodiment), into the primary digital information as secondary digital information by performing a phase modulation on the edges of each recording mark (edges that determine the length of the recording mark in a track direction). To do so, the optical disc recording apparatus 100 includes a formatter 1, a pseudo random number generator 2, a timing generator 3, an XOR (exclusive-OR) gate 4, a PE (Phase Encoding) modulator 5, a phase modulator 6, a recording channel 7, and a recording head 8.

The formatter 1 modulates the primary digital information (hereinafter also referred to as "record data"), generates the secondary digital information, and controls the recording of the secondary digital information.

Figure 4:
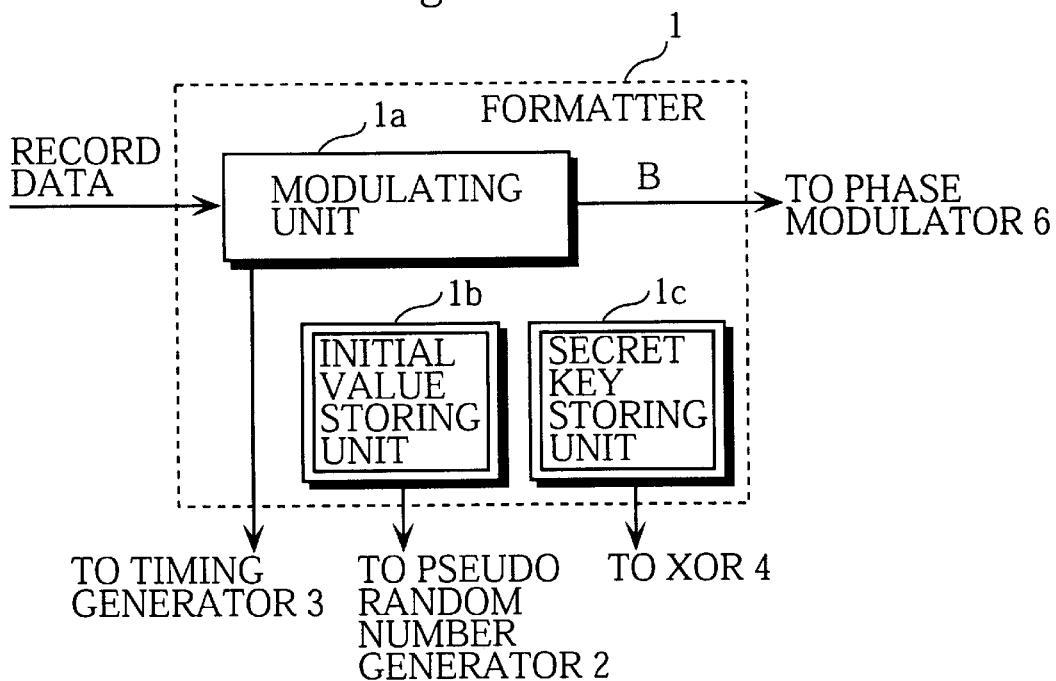
FIG. 4 is a block diagram showing the detailed construction of a formatter of the optical disc recording apparatus of the first embodiment.

FIG. 4 is a block diagram showing the detailed construction of the formatter 1. As shown in FIG. 4, the formatter 1 includes a modulating unit 1a for modulating record data sent from an external source to generate a signal (a channel signal B) that is suitable for a DVD 9, an initial value storing unit 1b for secretly prestoring an initial value of a pseudo random number series to be generated by the pseudo random number generator 2, and a secret key storing unit 1cfor prestoring a 56-bit secret key.

Figure 3:
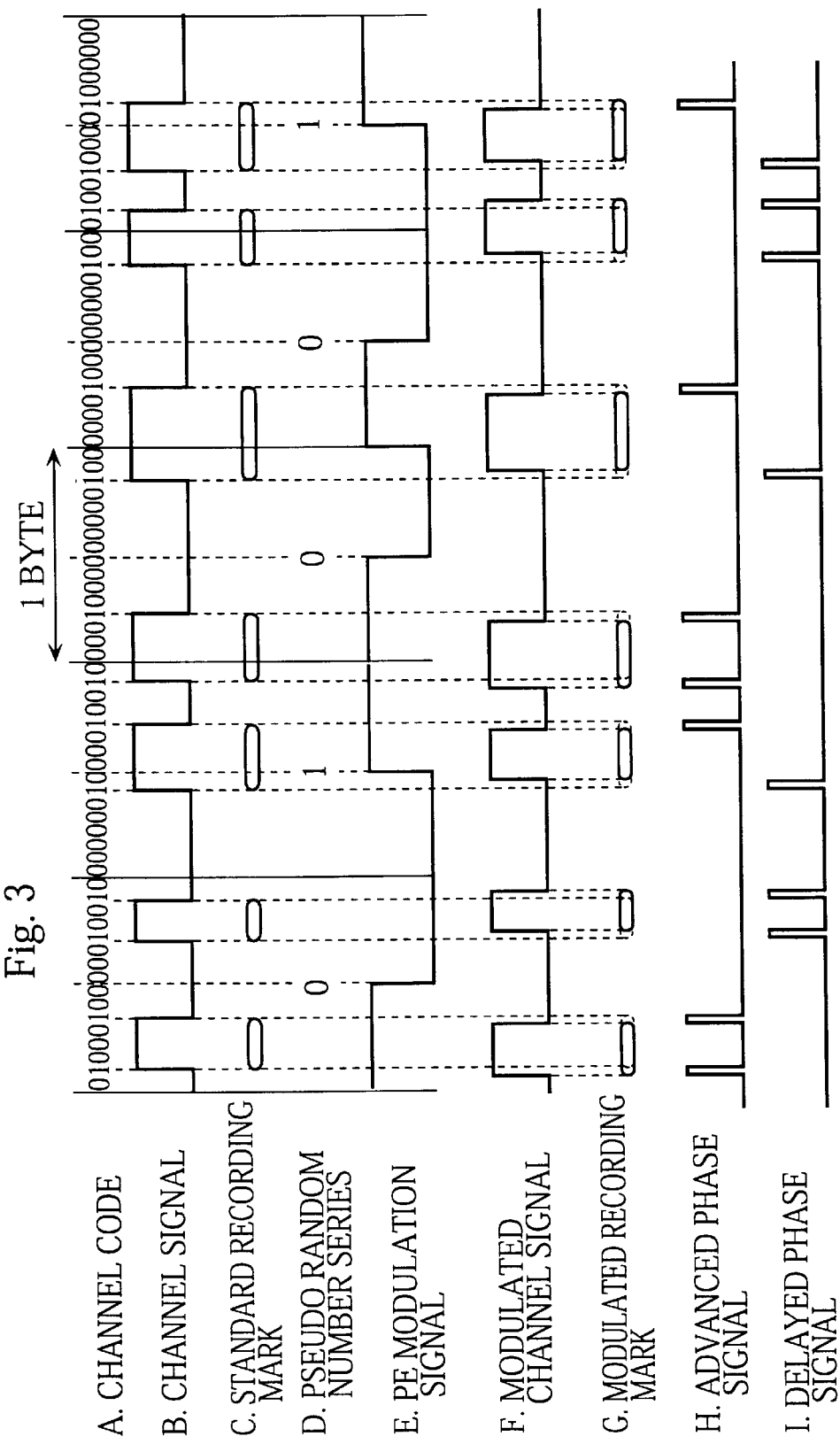
FIG. 3 is a timing chart showing main signals which are related to the operation of the optical disc recording apparatus of the first embodiment.

The modulating unit 1a converts each 8-bit code (each byte code) of the record data into a 16-bit channel code A (8 to 16 conversion), generates a channel signal B by subjecting the channel code A to an NRZI conversion, and outputs the channel signal B to the phase modulator 6, as shown in the timing chart in FIG. 3.

Also, when the modulating unit 1a is instructed by a controller (not shown) to start the recording of the secret key, the modulating unit 1a outputs a timing signal showing the start of each 1-byte record data to the timing generator 3. Note that the recording of the secret key is hereinafter referred to as the "secret key recording operation", and the mode of performing the secret key recording operation is hereinafter referred to as the "secret key recording mode".

The initial value storing unit 1b outputs 15-bit data (the initial value) that is secretly prestored therein to the pseudo random number generator 2 after the secret key recording operation starts.

The secret key storing unit 1csequentially outputs each bit of the 56-bit secret key secretly prestored therein to the XOR gate 4 after the secret key recording operation has been started. More specifically, every time the modulating unit 1a modulates 256-byte record data, the secret key storing unit 1csequentially outputs each bit of the 56-bit secret key from the LSB (least significant bit) to the MSB (Most significant bit) in NRZ format. Because the secret key storing unit 1coutputs the 56-bit. secret key to the XOR gate 4 in a bit-serial manner as a secret key bit string, the 56-bit secret key is embedded into record data of 256×56 bytes.

Figure 5:
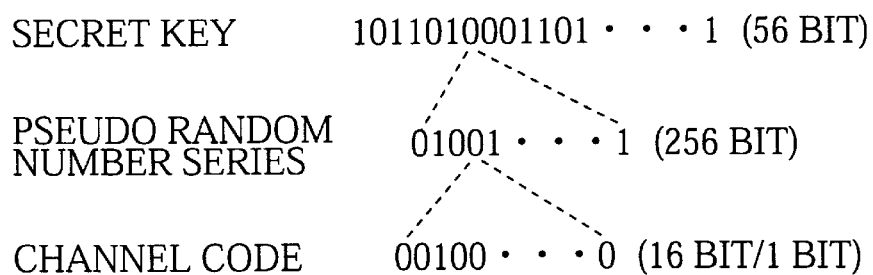
FIG. 5 shows the correspondences between a secret key, a pseudo random number series, and record data.

FIG. 5 shows the correspondences between the secret key, the pseudo random number series, and the record data. FIG. 5 shows that to record the 56-bit secret key onto the optical disc as hidden information, a 256-bit pseudo random number series is used for each bit of the secret key, and each bit of the pseudo random number series is embedded into 1-byte record data (a 16-bit channel code). Note that each bit of the 56-bit secret key is used as a flag showing whether the corresponding 256-bit pseudo random number series should be logically inverted, as will be described later.

The timing generator 3 generates a clock signal (byte clock) that is synchronized with each byte of the record data according to the timing signal outputted from the modulating unit 1a, and the timing generator 3 outputs the clock signal to the pseudo random number generator 2. According to the timing signal outputted from the modulating unit 1a and a clock signal outputted from a clock oscillator (not shown), the timing generator 3 also generates a timing signal showing each center (each point when the phase becomes 180°) of the channel signal B outputted from the formatter 1, and outputs the timing signal to the PE modulator 5.

The pseudo random number generator 2 generates the pseudo random number series (an M series) where $2^{15}$-bit series are set as one cycle. When doing so, the pseudo random number generator 2 sets the initial value outputted from the initial value storing unit 1b as a preset value and the byte clock outputted from the timing generator 3 as a shift clock.

Figure 6:
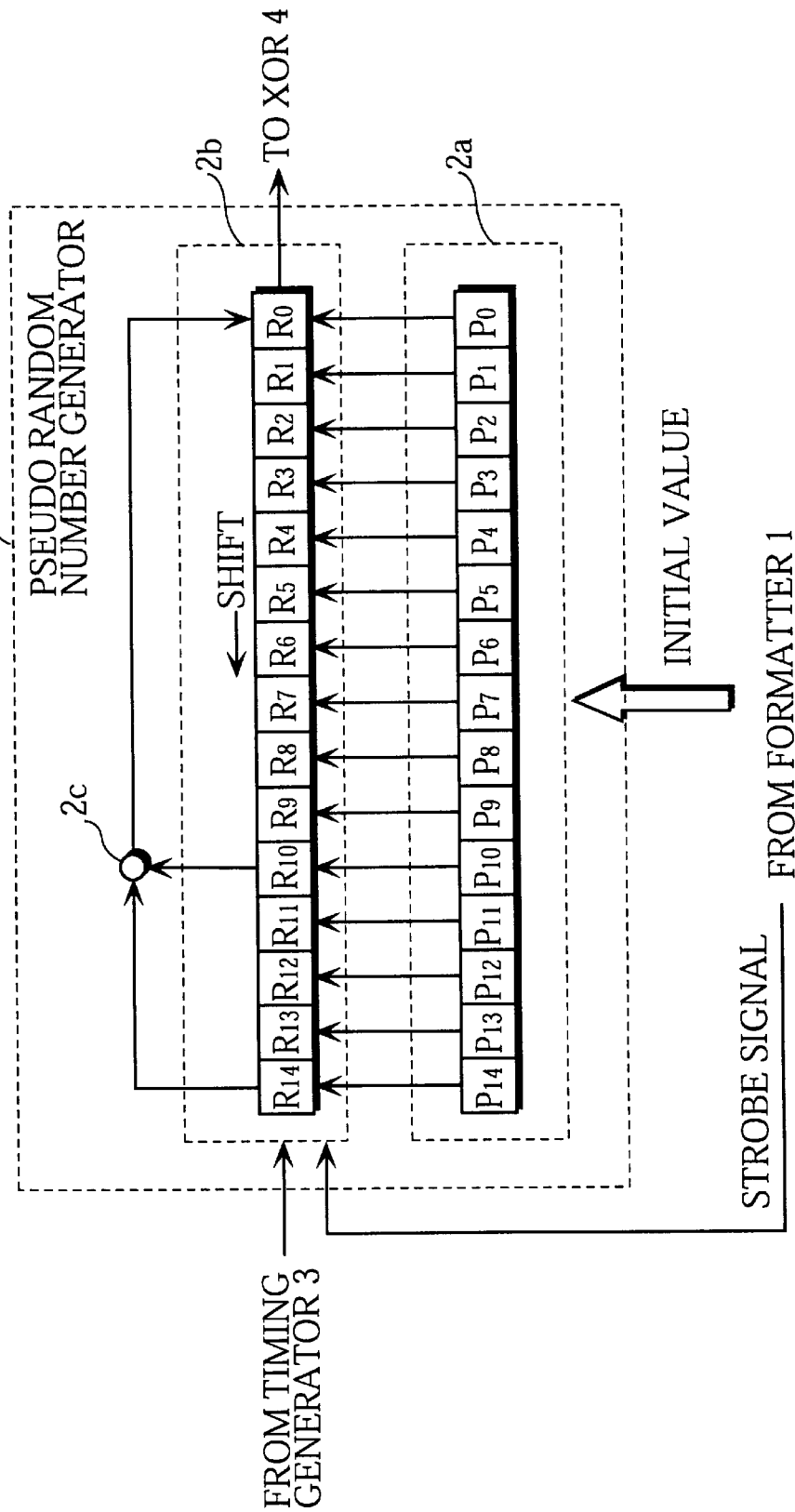
FIG. 6 is a circuit diagram showing the detailed construction of a pseudo random number generator of the optical disc recording apparatus of the first embodiment.

FIG. 6 is a circuit diagram showing the detailed construction of the pseudo random number generator 2. As shown in FIG. 6, the pseudo random number generator 2 includes a 15-bit preset register 2a for holding the initial value from the initial value storing unit 1b, a shift register 2b that has 15 rows (bits), and an XOR gate 2c for calculating an exclusive-OR of the output values from the MSB (the $14^{th}$ digit) and the $10^{th}$ digit of the shift register 2b.

After the initial value is outputted from the initial value storing unit 1b and set in the preset register 2a, the initial value is written into the shift register 2b by a strobe signal that is sent from the formatter 1 immediately after the initial value is set in the preset register 2a. Then, in synchronization with the byte clock outputted from the timing generator 3, the 15-bit value in the shift register 2b is shifted to the left by one digit, and the output value from the XOR 2c is sent to the LSB (the $0^{th}$ digit) of the shift register 2b and is stored therein. In this manner, a 1-bit random number is newly generated in the MSB of the shift register 2b for each 1-byte record data and is sent to the XOR 4 as part of the pseudo random number series.

It should be noted here that, in this embodiment, the pseudo random number generator 2 is used to generate a pseudo random number series to be embedded into record data of 256×56 bytes, which is to say a pseudo random number series of 256×56 bits, in the secret key recording mode.

The XOR gate 4 generates a pseudo random number series D by calculating exclusive-ORs of the pseudo random number series outputted from the pseudo random number generator 2 and the secret key bit string outputted from the secret key storing unit 1c, and the XOR gate 4 outputs the pseudo random number series D to the PE modulator 5. That is, according to each bit value of the 56-bit secret key, the XOR gate 4 outputs a 256-bit section of the pseudo random number series generated by the pseudo random number generator 2 as it is to the PE modulator 5, or the XOR gate 4 outputs a 256-bit section of the pseudo random number series that has been logically inverted to the PE modulator 5.

The PE modulator 5 generates a PE modulation signal E by performing a PE modulation on the modulated pseudo random number series D that is outputted from the XOR gate 4, and the PE modulator 5 outputs the PE modulation signal E to the phase modulator 6 according to the timing signal outputted from the timing generator 3. The PE modulation signal E generated in this manner has a waveform shown in the timing chart in FIG. 3. As shown in this timing chart, the PE modulation signal E falls at the center of the channel signal B if the pseudo random number D outputted from the XOR gate 4 is "0", rises at the center of the channel signal B if the pseudo random number D outputted from the XOR gate 4 is "1", and is inverted at the boundary of the channel signal B if the XOR gate 4 outputs a random number that is the same as a previous number.

The phase modulator 6 performs a phase modulation on the channel signal B outputted from the formatter 1 according to the PE conversion signal E. That is, the phase modulator 6 generates a modulated channel signal F by advancing or delaying each edge of the channel signal B by a fixed slight time. The phase modulator 6 then outputs the modulated channel signal F to the recording channel 7. The fixed slight time is preset as half (0.5σ) of the standard deviation a in the frequency distribution (variation) of jitter that is observed when an ordinary reproducing apparatus reproduces an ordinary DVD that records only primary digital information, that is, a DVD that has been produced without the phase modulator 6 and so does not record secondary digital information.

Figure 7:
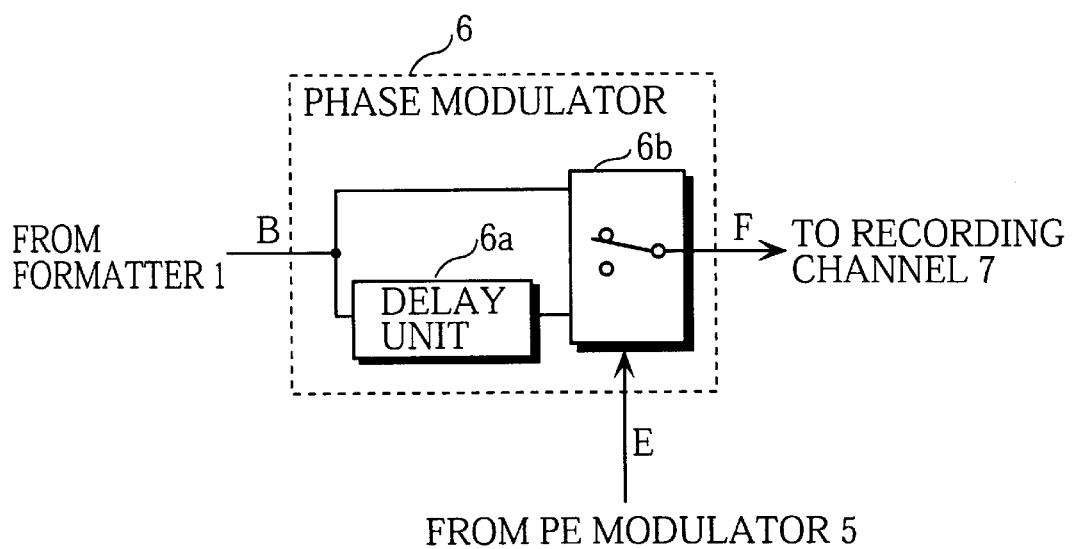
FIG. 7 is a block diagram showing the detailed construction of a phase modulator of the optical disc recording apparatus of the first embodiment.

FIG. 7 is a block diagram showing the detailed construction of the phase modulator 6. As shown in FIG. 7, the phase modulator 6 includes a delay unit 6a for delaying the channel signal B outputted from the formatter 1 by the slight time, and a selector 6b that has two input terminals and one output terminal. If the PE modulation signal E inputted as a control signal is "1", the selector 6b selects the channel signal B that is directly outputted from the formatter 1, and, if the PE modulation signal E is "0"; the selector 6b selects the channel signal B that is outputted from the formatter 1 via the delay unit 6a.

As a result, in relation to a time axis, the phases of the rising and trailing edges of the channel signal B inputted into the phase modulator 6 are advanced by the slight time if the PE modulation signal E is "1" (0–180°), and the phases of the rising and trailing edges of the channel signal B are delayed by the slight time if the PE modulation signal E is "0" (180–360°). That is, the channel signal B inputted into the phase modulator 6 undergoes a jitter modulation based on the pseudo random number series D and is converted into a modulated channel signal F, as shown in FIG. 3.

The recording channel 7 generates a control signal for controlling the irradiation (ON/OFF) of a laser beam onto the DVD 9 in synchronization with the changes (1/0) in the modulated channel signal F from the phase modulator 6, and the recording channel 7 outputs the control signal to the recording head 8. The recording head 8 forms pits on the DVD 9 according to the control signal outputted from the recording channel 7. More specifically, the recording head 8 spirally directs a beam spot (irradiates the laser beam) onto the surface of the rotating DVD according to the control signal. In this manner, modulated recording marks G formed of optically readable pits (lands or grooves) are formed on the DVD 9.

Figure 8:
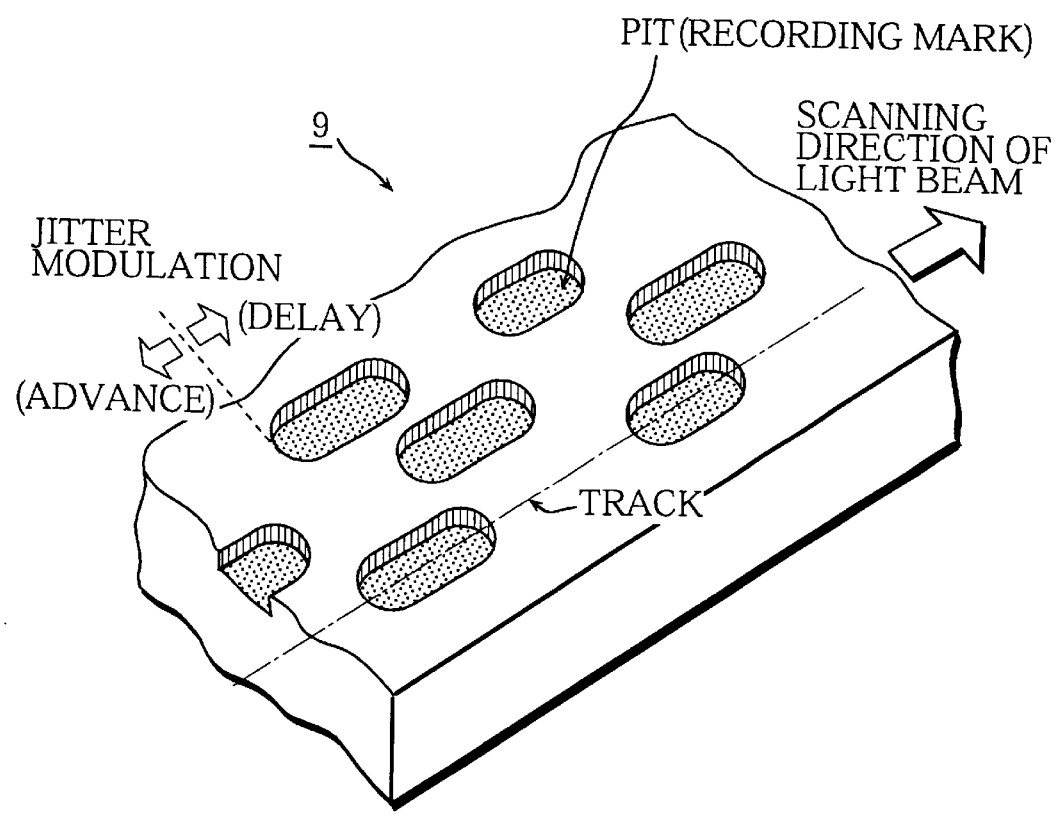
FIG. 8 shows the surface of a DVD on which pits have been formed by the optical disc recording apparatus of the first embodiment.

FIG. 8 shows the surface of the recording layer of the DVD 9 onto which the recording head 8 has formed pits. Each pit formed in the secret key recording mode has edge positions whose phases are displaced (advanced or delayed) in the track direction from edge positions of the case of a non-secret key recording mode. Here, each displacement amount corresponds to the fixed slight time.

Figure 9:
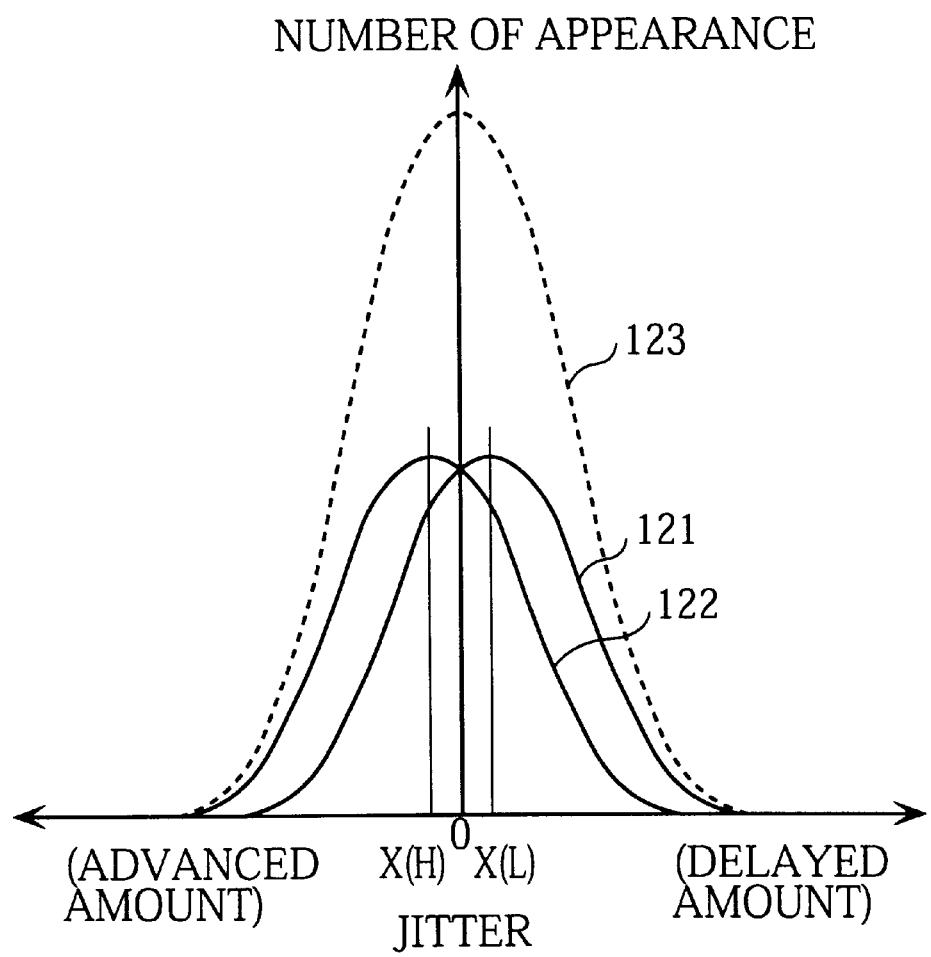
FIG. 9 is a graph showing the distribution of jitter observed for pits that are formed by the optical disc recording apparatus of the first embodiment.

FIG. 9 is a graph showing the distribution of jitter observed for pits (that is, modulated recording marks G obtained as a result of the jitter modulation) that are formed in the secret key recording mode described above.

The curve 121 shows the distribution of jitter observed at the edges of the modulated recording marks G which are formed when the PE modulation signal E is "0". As shown in FIG. 9, the curve 121 resembles a Gaussian curve whose peak appears at the point X(L) where the phase is delayed by the displacement amount. The curve 122 shows the distribution of jitter observed at the edges of the modulated recording marks G which are formed when the PE modulation signal E is "1". As shown in FIG. 9, the curve 122 resembles a Gaussian curve whose peak appears at the point X(H) where the phase is advanced by the displacement amount. The curve 123 shows the jitter distribution obtained by combining the curves 121 and 122.

The present invention is based on the principle that the jitter distribution represented by the curve 123 can be separated into the distributions which are represented by the curves 121 and 122 by performing a synchronous detection using a pseudo random number series that is the same as the pseudo random series used to record the secret key.

The DVD 9 onto which the 56-bit secret key has been embedded by the optical disc recording apparatus 100 has the following feature.

As described above, the secret key is recorded by performing the jitter modulation with which the position of each edge (two edges in the track direction) of each recording mark is displaced by a small amount in the track direction (in the direction of scanning of beam spots). Therefore, an ordinary reproducing apparatus that does not have a function of reading information that is hidden within jitter cannot read the secret key.

Consequently, even if the entire content of a DVD on which a secret key has been recorded in the manner as described above is read by an ordinary reproducing apparatus and is recorded onto another DVD, only the primary digital information is copied and the secondary digital information (secret key) hidden within jitter is not copied. This makes it possible to distinguish original DVDs from DVDs that are replicated without proper authorization. As a result, copyright infringements by pirated DVDs can be avoided, for instance, by providing a reproducing apparatus with a function of allowing the reproduction of only DVDs that include secret keys.

The optical disc recording apparatus 100 does not record the 56-bit secret key onto a DVD as it is, but the optical disc recording apparatus records 256-bit sections of the random number series, which each correspond to one bit of the secret key, onto a DVD. That is, the information hidden within jitter is not a bit string of the secret key but a random number series that indirectly indicates the secret key. This makes it difficult to crack the secret key and thereby enhances the confidentiality of the secret key.

Furthermore, to perform the jitter modulation on the channel signal B, the optical disc recording apparatus 100 does not use the random number series as it is, but the optical disc recording apparatus 100 uses the PE modulation signal E that is obtained by subjecting the random number series to the PE modulation. As a result, the modulation for advancing a phase and the modulation for delaying a phase are performed with equal probability for each 1-byte record data (each channel code). More specifically, one of these modulations is performed for the phase range "0–180°" of a 1-byte record data and the other of these modulations is performed for the phase range "180–360°" of the record data. This makes the extraction and reproduction of clocks stable during reproduction of the optical disc.

If edge phases are successively advanced or delayed many times, a PLL (Phase Locked Loop) for extracting a clock will follow these unbalanced edge positions during reproduction. This makes the detection of a phase error signal difficult and reduces the sensitivity for detecting phase modulated components. As described above, however, the optical disc recording apparatus 100 performs the jitter modulation with the PE modulation signal E, so that such a problem will not arise in this embodiment.

Optical Disc Reproducing Apparatus

The following is a description of a reproducing apparatus that is compatible with a DVD onto which a secret key has been recorded in the manner as described above.

Figure 10:
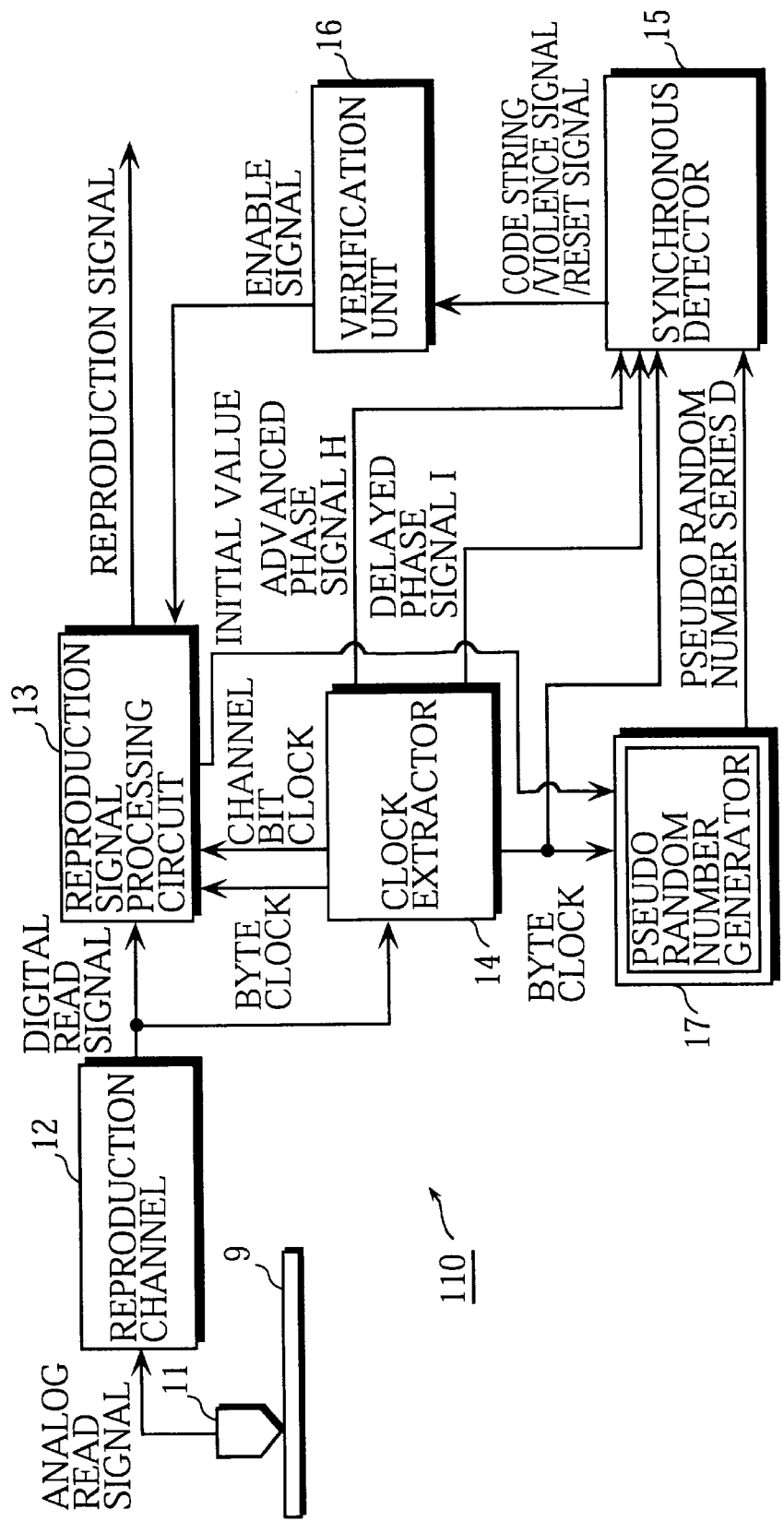
FIG. 10 is a block diagram showing the construction of an optical disc reproducing apparatus of the first embodiment of the present invention.

FIG. 10 is a block diagram showing the construction of the characteristic parts of an optical disc reproducing apparatus 110 of the present invention. Note that the waveforms of main signals H and I shown in FIG. 10 are the same as those shown in the timing chart in FIG. 3.

The optical disc reproducing apparatus 110 is a DVD reproducing apparatus corresponding to the optical disc recording apparatus 100. That is, the optical disc reproducing apparatus not only reproduces primary digital information according to the positions of recording marks on a DVD, but the optical disc reproducing apparatus 110 also detects secondary digital information (a secret key) which is hidden within jitter of the recording marks that are observed during the reproduction of the primary digital information. The optical disc reproducing apparatus 110 protects the copyright of the DVD according to the detection result of the secondary digital information. To do so, the optical disc reproducing apparatus 110 includes a reproduction head 11, a reproduction channel 12, a reproduction signal processing circuit 13, a clock extractor 14, a synchronous detector 15, a verification unit 16, and a pseudo random number generator 17.

The reproduction head 11 is an optical pickup. That is, the reproduction head 11 condenses and irradiates a light beam onto the recording marks formed on the rotating DVD 9, generates an analog read signal showing the edge positions of the modulated recording marks G from the reflected light, and outputs the analog read signal to the reproduction channel 12.

The reproduction channel 12 converts the analog read signal from the reproduction head 11 into a digital read signal by equalizing and shaping the waveform of the analog read signal. The reproduction channel 12 then outputs the digital read signal to the reproduction signal processing circuit 13 and the clock extractor 14.

The clock extractor 14 extracts a clock and generates a signal according to the digital read signal outputted from the reproduction channel 12. More specifically, the clock extractor 14 extracts a channel bit clock that is synchronized with respective bits composing the channel code, and the clock extractor 14 generates an advanced phase signal H and a delayed phase signal I with reference to the channel bit clock. The advanced phase signal H only shows the advanced components of the read signal, and the delayed phase signal I only shows the delayed components of the read signal. The clock extractor 14 also extracts a byte clock that is synchronized with each 1-byte record data of the digital read signal. The clock extractor 14 further outputs the channel bit clock to the reproduction signal processing circuit 13, outputs the advanced phase signal H to the synchronous detector 15, outputs the delayed phase signal I to the synchronous detector 15, and outputs the byte clock to the reproduction signal processing circuit 13, the synchronous detector 15, and the pseudo random number generator 17.

Figure 11:
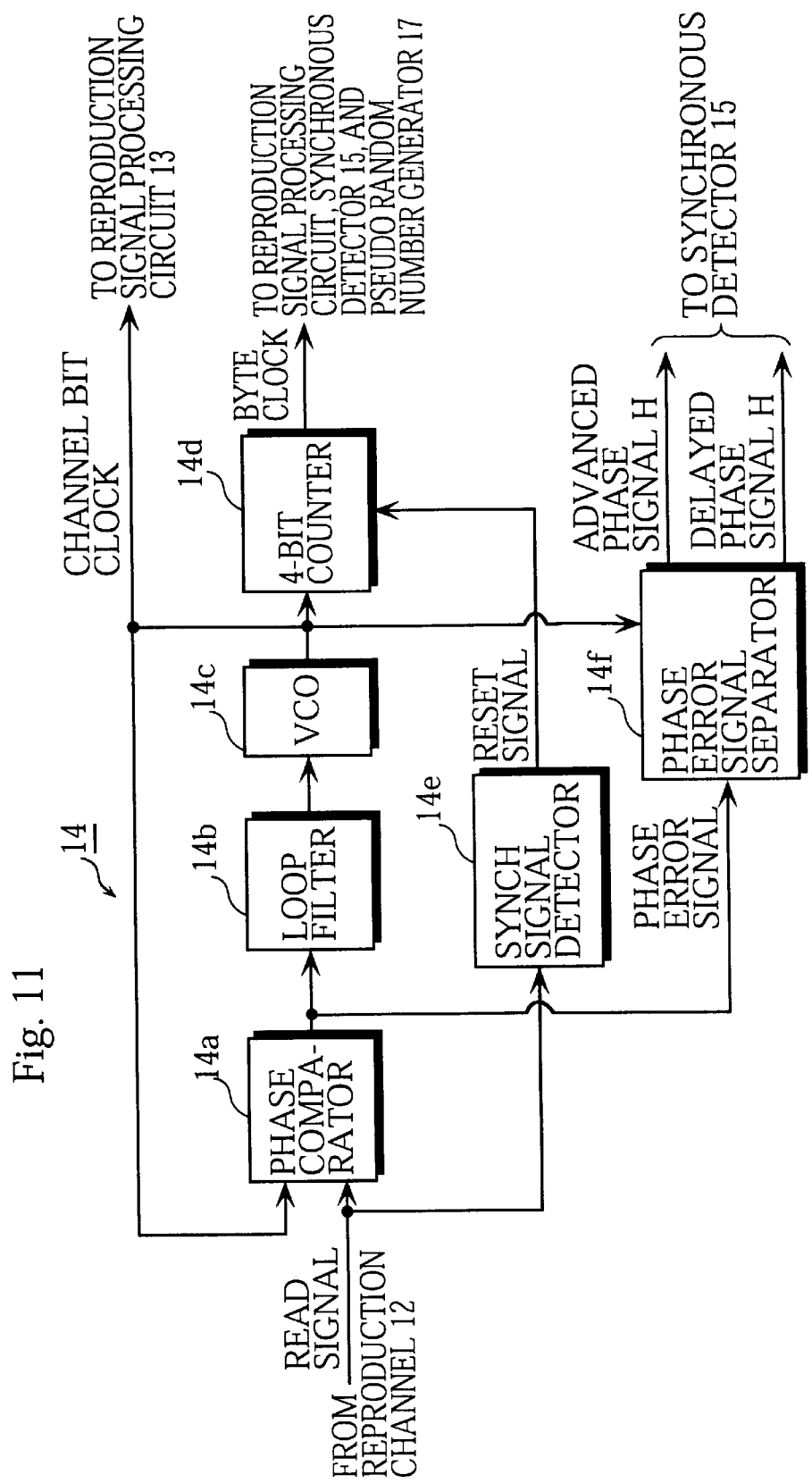
FIG. 11 is a block diagram showing the detailed construction of a clock extractor of the optical disc reproducing apparatus of the first embodiment.

FIG. 11 is a block diagram showing the detailed construction of the clock extractor 14. As shown in FIG. 11, the clock extractor 14 includes a 4-bit counter 14d, a synch signal detector 14e, a phase error signal separator 14f, and a PLL circuit that includes a phase comparator 14a, a loop filter 14b, and a VCO (Voltage Controlled Oscillator) 14c.

The phase comparator 14a includes a counter, an XOR gate, and a flip-flop, and the phase comparator 14a calculates a phase difference between (i) each of the rising and trailing edges of the read signal outputted from the reproduction channel 12, and (ii) the nearest rising edge of the channel bit clock from the VCO 14c. The phase comparator 14a then outputs the phase difference as a phase error signal to the loop filter 14b and the phase error signal separator 14f.

The loop filter 14b is a lowpass filter that smooths the phase error signal from the phase comparator 14a and converts the smoothed phase error signal into a direct current voltage signal. The VCO 14c is a voltage controlled oscillator that generates a channel bit clock of a frequency corresponding to the voltage signal outputted from the loop filter 14b.

The synch signal detector 14e detects the synchronization pattern included in the read signal, and the synch signal detector 14 outputs the synchronization pattern to the 4-bit counter 14d as a reset signal. The 4-bit counter 14d is a counter that divides the channel bit clock outputted from the VCO 14c by 16, and the 4-bit counter 14d is reset by the reset signal outputted from the synch signal detector 14e. That is, the 4-bit counter 14d outputs a byte clock which is synchronized with each 1-byte record data of the read signal.

The phase error signal separator 14f separates the phase error signal from the phase comparator 14a into the advanced phase signal H and the delayed phase signal I, and the phase error signal separator 14f outputs the signals H and I to the synchronous detector 15.

Figure 12:
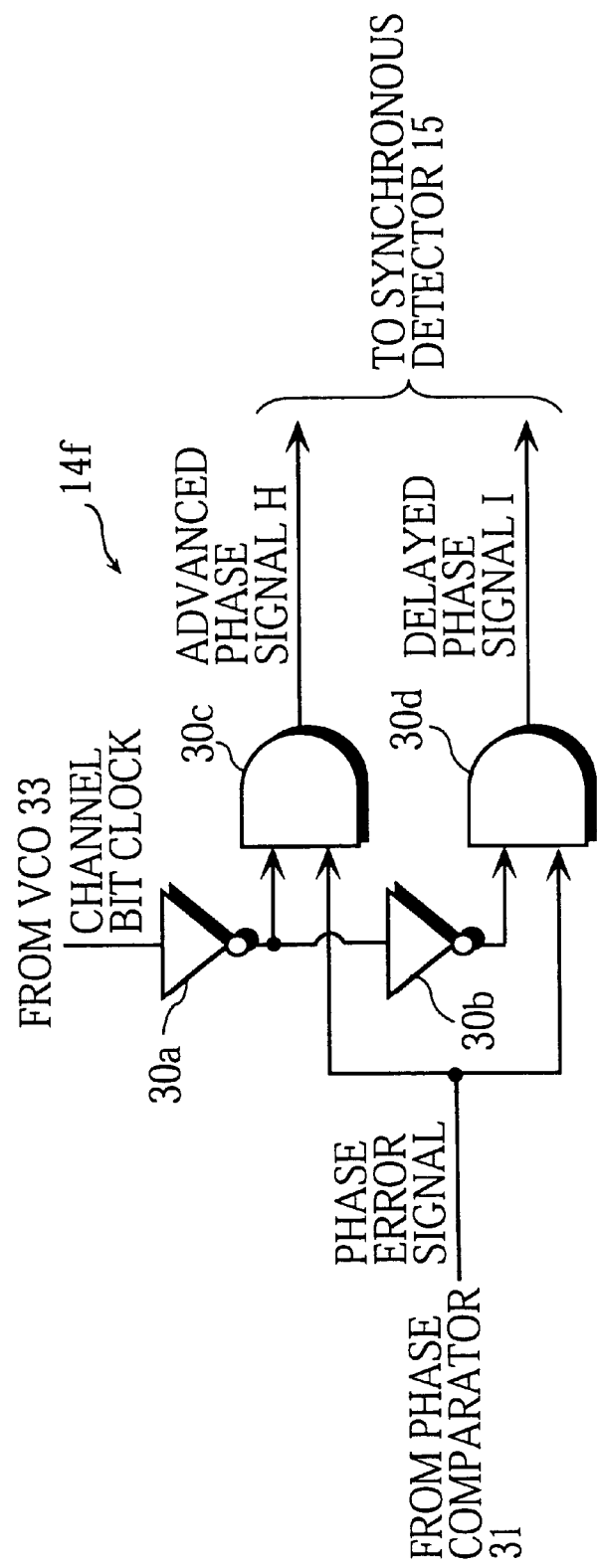
FIG. 12 is a circuit diagram showing the detailed construction of a phase error signal separator of the clock 20 extractor.

FIG. 12 is a circuit diagram showing the detailed construction of the phase error signal separator 14f. The phase error signal separator 14f includes two inverters 30a and 30b, and two AND gates 30c and 30d.

Figure 13:
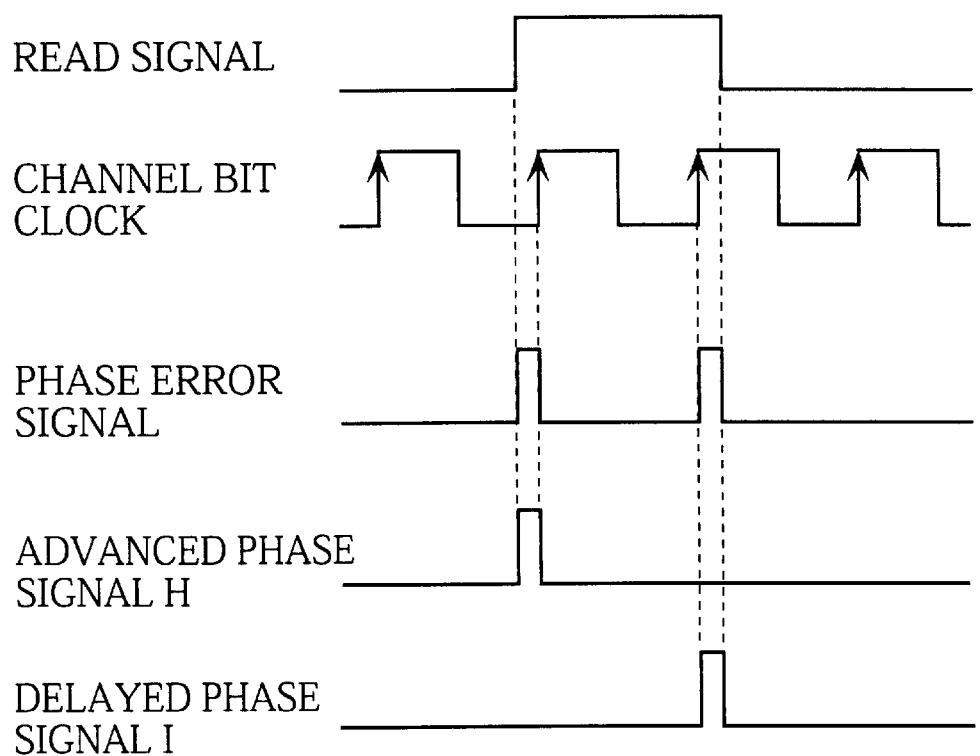
FIG. 13 is a timing chart showing signals related to the operation of the phase error signal separator shown in FIG. 12.

FIG. 13 is a timing chart showing the change in each signal concerning the operation of the phase error signal separator 14f. Although the phase error signal outputted from the phase comparator 14a includes advanced phase components and delayed phase components, the phase error signal is separated into the phase error signals H and I in synchronization with the channel bit clock. As a result, the waveform of the signal outputted from the AND gate 30c (advanced phase signal H) only represents the advanced phase components and the waveform of the signal outputted from the AND gate 30d (delayed phase signal I) only represents the delayed phase components.

The reproduction signal processing circuit 13 demodulates the read signal outputted from the reproduction channel 12, controls the detection of the secondary digital information, and protects copyrights according to the detection result of the secondary digital information.

Figure 14:
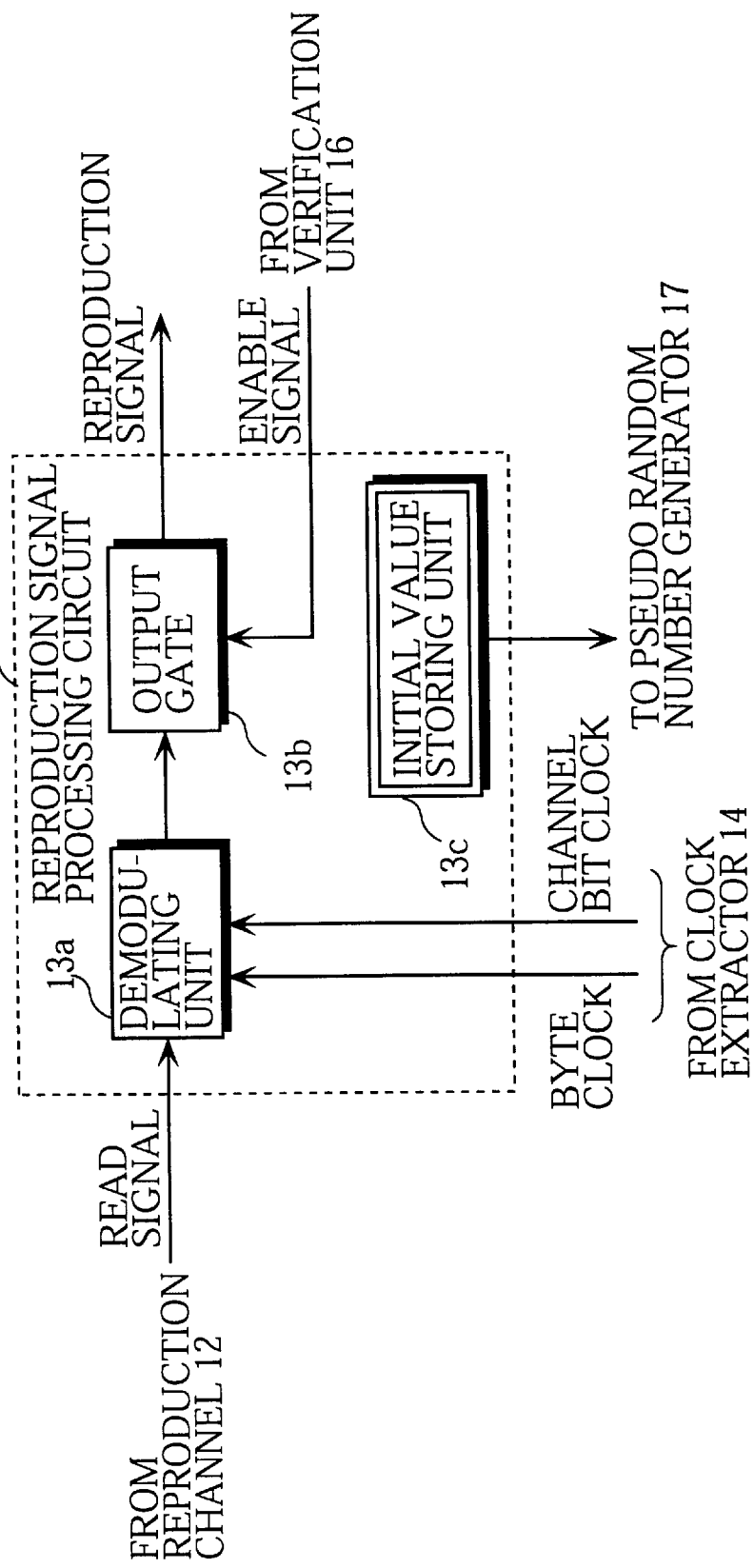
FIG. 14 is a block diagram showing the detailed construction of a reproduction signal processing circuit of the optical disc reproducing apparatus of the first embodiment.

FIG. 14 is a block diagram showing the detailed construction of the reproduction signal processing circuit 13. As shown in FIG. 14, the reproduction signal processing circuit 13 includes a demodulating unit 13a, an output gate 13b, and an initial value storing unit 13c.

The demodulating unit 13a is a demodulating circuit corresponding to the modulating unit 1a of the optical disc recording apparatus 100. That is, the demodulating unit 13a demodulates each channel code A by sampling the read signal outputted from the reproduction channel 12 in synchronization with the channel bit clock outputted from the clock extractor 14, generates a record data string by converting each demodulated channel code to a corresponding 8-bit record data (16 to 8 conversion) in synchronization with the byte clock outputted from the clock extractor 14, and outputs the record data string to the output gate 13b.

The output gate 13b is a buffer gate used to protect copyrights. That is, the output gate 13b outputs the record data string outputted from the demodulating unit 13a to the periphery as a reproduction signal only while receiving an enable signal (a notification confirming that the DVD 9 records an authorized secret key) from the verification unit 16.

The initial value storing unit 13c is a register for secretly prestoring a value (a 15-bit initial value) that is the same as that in the initial value storing unit 1b of the optical disc recording apparatus 100. Upon being instructed by a controller (not shown) to start the reading of a secret key, the initial value storing unit 13c outputs the initial value to the pseudo random number generator 17. Note that the reading of the secret key is hereinafter referred to as the "secret key reading operation" and a mode of performing the secret key reading operation is hereinafter referred to as the "secret key reading mode".

The pseudo random number generator 17 has the same function as the pseudo random number generator 2 of the optical disc recording apparatus 100. That is, the pseudo random number generator 17 generates a pseudo random number series (M series) where $2^{15}$-bit strings are set as one cycle. When doing so, the pseudo random number generator 17 sets the initial value outputted from the initial value storing unit 13c as a preset value, and the pseudo random number generator 17 sets the byte clock outputted from the clock extractor 14 as a shift clock. In the optical disc recording apparatus 110, the pseudo random number generator 17 is used to generate a pseudo random number series of 256×56 bits.

The synchronous detector 15 is a circuit for detecting correlations between (i) the pseudo random number series outputted from the pseudo random number generator 17 and (ii) the advanced phase signal H and the delayed phase signal I outputted from the clock extractor 14. The synchronous detector 15 then informs the verification unit 16 of the correlation that is detected for each 1-bit random number (a positive correlation, a negative correlation, or no correlation).

Figure 15:
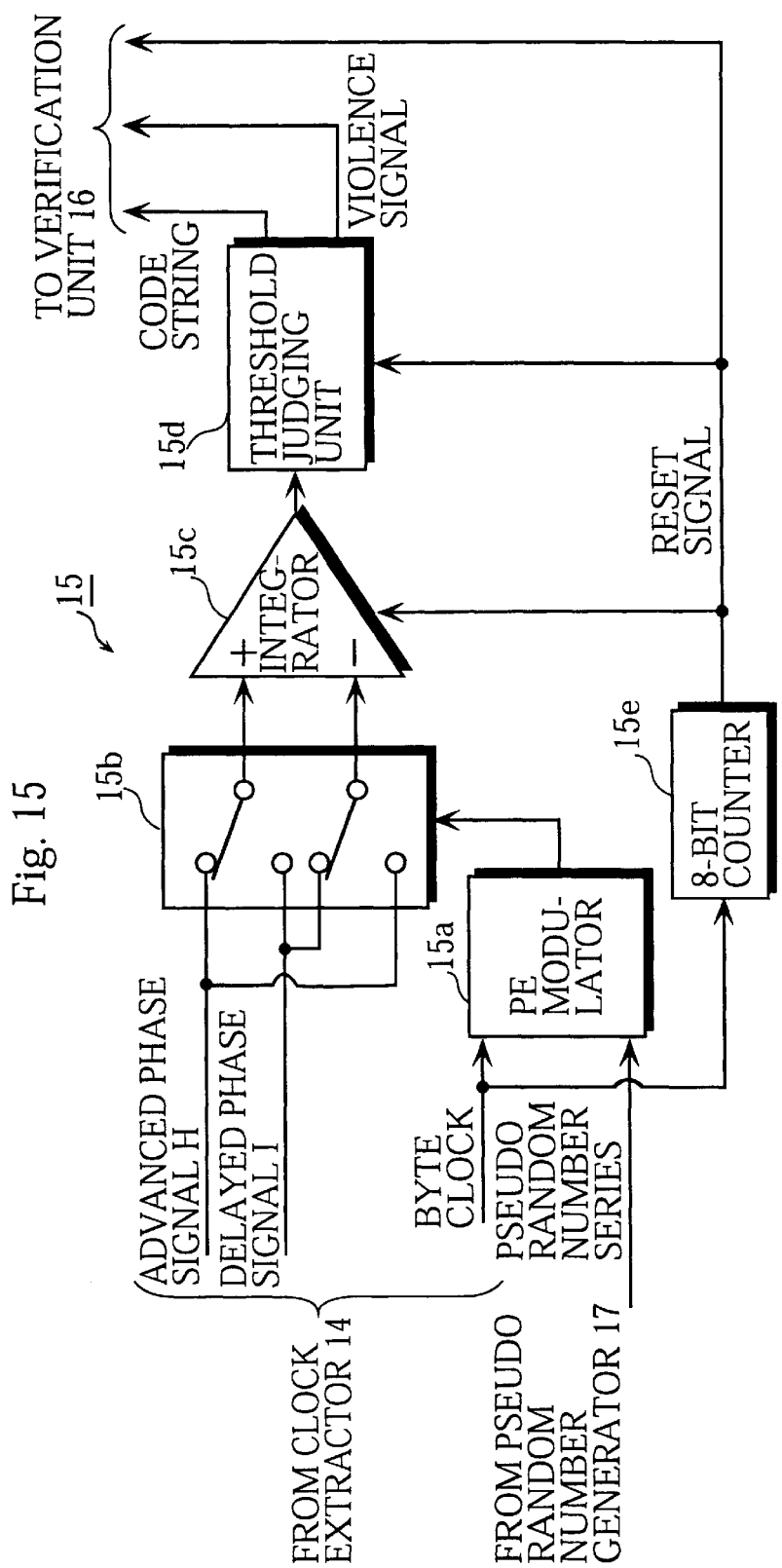
FIG. 15 is a circuit diagram showing the detailed construction of a synchronous detector of the optical disc reproducing apparatus of the first embodiment.

FIG. 15 is a circuit diagram showing the detailed construction of the synchronous detector 15. As shown in FIG. 15, the synchronous detector 15 includes a PE modulator 15a, a selector 15b, an integrator 15c, a threshold judging unit 15d, and an 8-bit counter 15e.

The PE modulator 15a combines the functions of the timing generator 3 and the PE modulator 5 of the optical disc recording apparatus 100. That is, the PE modulator 15a performs a PE conversion on the pseudo random number series outputted from the pseudo random number generator 17 according to the byte clock outputted from the clock extractor 14, and the PE modulator 15a outputs the converted pseudo random number series to the selector 15b as a switching control signal. That is, the signal outputted from the PE modulator 15a falls at the center of each 1-byte record data of the read signal if the pseudo random number outputted from the pseudo random number generator 17 is "0", rises at the center of each 1-byte record data if the pseudo random number is "1", and is inverted at the boundary of record data if the pseudo random number generator 17 outputs a random number that is the same as a previous number.

The selector 15b includes two switching circuits which each have two input terminals and one output terminal. If the control signal outputted from the PE modulator 15a is "1", the selector 15b passes the advanced phase signal H and the delayed phase signal I to the positive input terminal and the negative input terminal of the integrator 15c, respectively. If the control signal is "0", the selector 15b passes the advanced phase signal H and the delayed phase signal I to the negative input terminal and the positive input terminal, respectively.

The 8-bit counter 15e is a counter that divides the byte clock outputted from the clock extractor 14 by 256 and outputs the division result to the integrator 15c, the threshold judging unit 15d, and the verification unit 16 as a reset signal. Accordingly, the reset signal has a waveform such that a reset pulse rises every time the pseudo random number generator 17 outputs a 256-bit section of the random number series.

The integrator 15c is an analog integrator of a differential input and bipolar output type. That is, the integrator 15c adds the area of each pulse that is applied to the positive input terminal to an integral, subtracts the area of each pulse that is applied to the negative input terminal from the integral, and outputs an analog signal equal to the integral thereof to the threshold judging unit 15d. Upon receiving a reset signal from the 8-bit counter, the integrator 15c resets the integral and newly starts the stated operation.

More specifically, while the PE modulation signal outputted from the PE modulator 15a is "1", the integrator 15c adds the area of each pulse appearing in the advanced phase signal H to the integral and subtracts the area of each pulse appearing in the delayed phase signal I from the integral. While the PE modulation signal outputted from the PE modulator 15a is "0", the integrator 15c subtracts the area of each pulse appearing in the advanced phase signal H from the integral and adds the area of each pulse appearing in the delayed phase signal I to the integral. As a result, the integrator 15c outputs a signal whose waveform represents an integrated area of pulses that are applied to the positive and negative input terminals.

Accordingly, if positive correlations successively exist, that is, if pulses continuously appear in the advanced phase signal H while the PE modulation signal is "1" and in the delayed phase signal I while the PE modulation signal is "0", the output waveform of the integrator 15c becomes a ramp waveform that increases in a positive direction. On the other hand, if negative correlations successively exist, that is, if pulses continuously appear in the delayed phase signal I while the PE modulation signal is "1" and in the advanced phase signal H while the PE modulation signal is "0", the output waveform of the integrator 15c becomes a ramp waveform that decreases in a negative direction. Also, if there is no correlation, that is, if pulses randomly appear in the advanced phase signal H and the delayed phase signal I independently of the values of the PE modulation signal, the frequency in the appearance of pulses in the advanced phase signal H is almost equal to the frequency of appearances of pulses in the delayed phase signal I. Therefore, if there is no correlation, the integrator 15c outputs an analog signal having an output waveform that fluctuates so that the value of the outputted analog signal is maintained to be near the zero level.

The threshold judging unit 15d includes a comparator for judging to which voltage range the analog signal outputted from the integrator 15c belongs. There are three voltage ranges which are demarcated by a predetermined positive threshold voltage and a predetermined negative threshold voltage.

Figure 16:
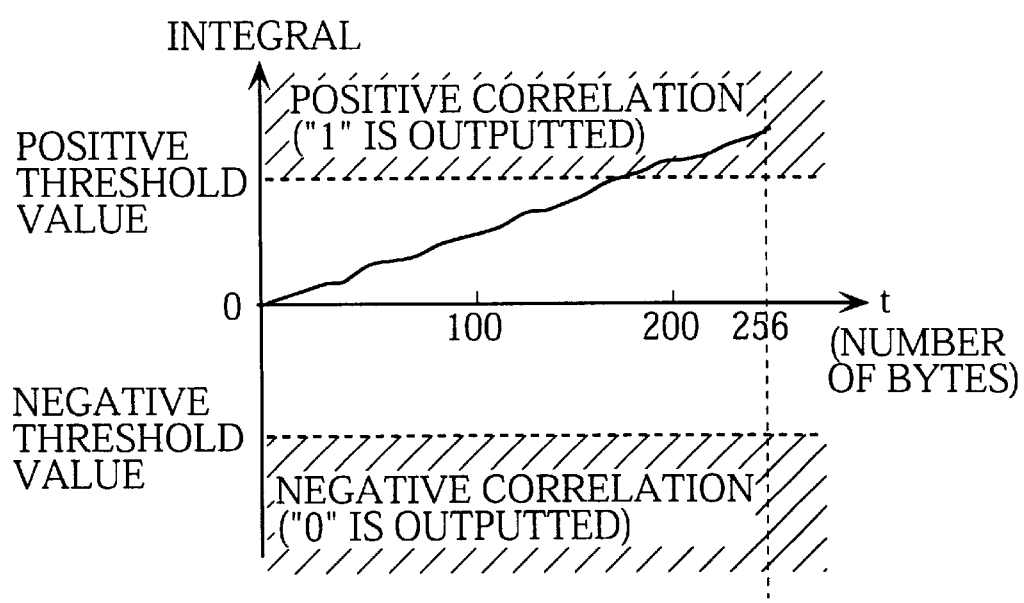
FIG. 16 shows an example waveform of the analog signal outputted from an integrator of the optical disc 5 reproducing apparatus of the first embodiment.

FIG. 16 relates to the operation of the threshold judging unit 15d and shows an example waveform of the analog signal outputted from the integrator 15c to the threshold judging unit 15d. Immediately before a reset signal is sent from the 8-bit counter 15e, the threshold judging unit 15d outputs a code string in a NRZ format to the verification unit 16. In the code string, a code is set as "1" when the signal voltage outputted from the integrator 15c is greater than the positive threshold voltage and a code is set as "0" when the signal voltage outputted from the integrator 15c is smaller than the negative threshold voltage. If the signal voltage outputted from the integrator 15c is between the positive and negative threshold voltages, the threshold judging unit 15d outputs a violation signal showing this situation to the verification unit 16.

It should be noted here that the threshold voltages described above are set so that the probability that the output voltage values of the integrator 15c exceed the threshold voltages is extremely high if the jitter modulation of the present invention has been performed, and is extremely low if the jitter modulation has not been performed. In reality, the threshold voltages are determined from the degree of jitter modulation during recording (the amount of each delay caused by the delay unit 6a of the phase modulator 6), the number of bytes (256) inputted into the integrator 15c, the average number of edges per byte, and the standard deviation in the natural (random) distribution of jitter.

As described above, the code string outputted from the threshold judging unit 15d shows the variation in the polarity (positive or negative) of the correlation that is observed for each 256-bit section of the pseudo random number. The variation in the polarity is information corresponding to the bit string showing whether each 256-bit section of the pseudo random number series is logically inverted during the jitter modulation.

The verification unit 16 verifies, based on the code string and the violation signal outputted from the synchronous detector 15, whether the DVD 9 that is currently being read is a medium onto which data has been recorded by the authorized optical disc recording apparatus 100. If the verification result is affirmative, the verification unit 16 outputs an enable signal for allowing the reproduction of the DVD 9 to the reproduction signal processing circuit 13.

Figure 17:
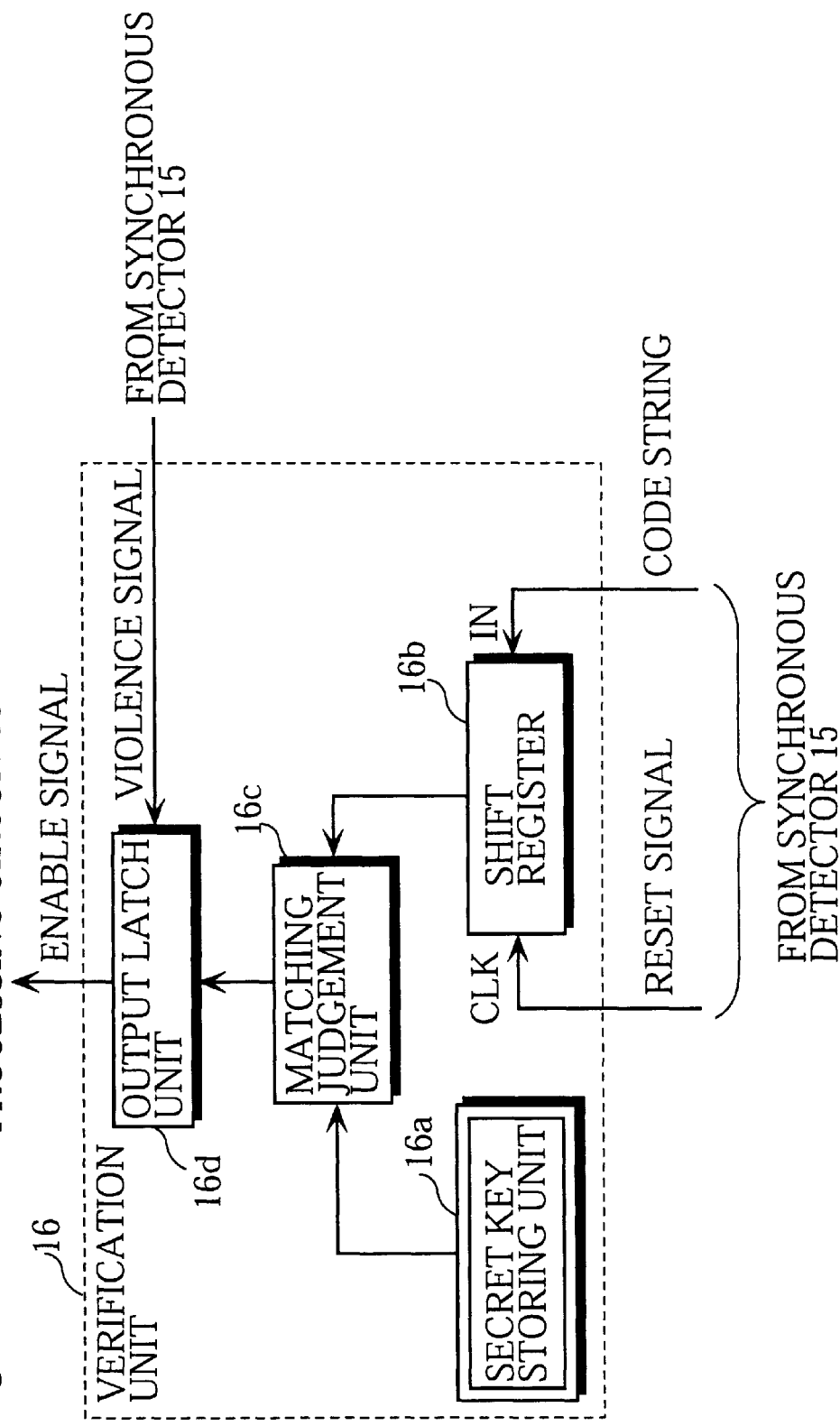
FIG. 17 is a block diagram showing the detailed construction of a verification unit of the optical disc reproducing apparatus of the first embodiment.

FIG. 17 is a block diagram showing the detailed construction of the verification unit 16. As shown in FIG. 17, the verification unit 16 includes a secret key storing unit 16a, a shift register 16b, a matching judgement unit 16c, and an output latch unit 16d.

The secret key storing unit 16a is a register for prestoring a 56-bit secret key that is the same as the 56-bit secret key in the secret key storing unit is of the optical disc recording apparatus 100. The shift register 16b includes 56 rows (bits), holds the code string outputted from the synchronous detector 15, and shifts the code string by using the reset signal outputted from the clock extractor 14 as a shift clock.

The matching judgement unit 16c compares, immediately after a 56-bit code string is inputted into the shift register 16b, the code string with the 56-bit secret key in the secret key storing unit 16a. That is, the matching judgement unit 16c judges whether the code string input into the shift register 16b completely matches the secret key. The matching judgement unit 16c then outputs the comparison result to the output latch unit 16d.

The output latch unit 16d outputs the enable signal to the reproduction signal processing circuit 13 only if the output latch unit 16d does not receive violation signal from the synchronous detector 15 and if the output latch unit 16d receives a comparison result from the matching judgement unit 16c showing that the code string completely matches the secret key. That is, the output latch unit 16d outputs the enable signal to the reproduction signal processing circuit 13 if it is successively confirmed 56 times (for each 256-bit section of the pseudo random number series outputted from the pseudo random number generator 17 to the synchronous detector 15) that there is a positive or negative correlation between the 256-bit section and the phase error signal included in the read signal and that the change in the polarity of the correlation matches the 56-bit secret key stored in the secret key storing unit 16a.

If the verification unit 16 outputs the enable signal to the reproduction signal processing circuit 13 after the secret key reading operation has been performed, it is judged that the DVD 9 is a medium into which a secret key has been embedded by the authorized optical disc recording apparatus 100. Therefore, the reproduction signal processing circuit 13 outputs a reproduction signal, which is obtained by demodulating the read signal from the reproduction channel 12, to the outside. On the other hand, if the verification unit 16 does not output an enable signal to the reproduction signal processing circuit 13, it is judged that the DVD 9 is not an authorized medium, and therefore, the reproduction signal processing circuit 13 does not output the reproduction signal to the outside for copyright protection.

In this manner, if it is not confirmed that the DVD 9 includes a secret key, the reading of record data from the DVD 9 is prohibited. Accordingly, even if a pirated DVD is produced by copying the content of an authorized DVD which includes a secret key, the reproduction of the pirated DVD is prohibited unless the secret key embedded into the original DVD by the jitter modulation is also copied to the pirated DVD. As a result, the copyrights of DVDs are thereby protected.

Second Embodiment

The second embodiment of the present invention is described below with reference to the drawings.

Optical Disc Recording Apparatus

Figure 18:
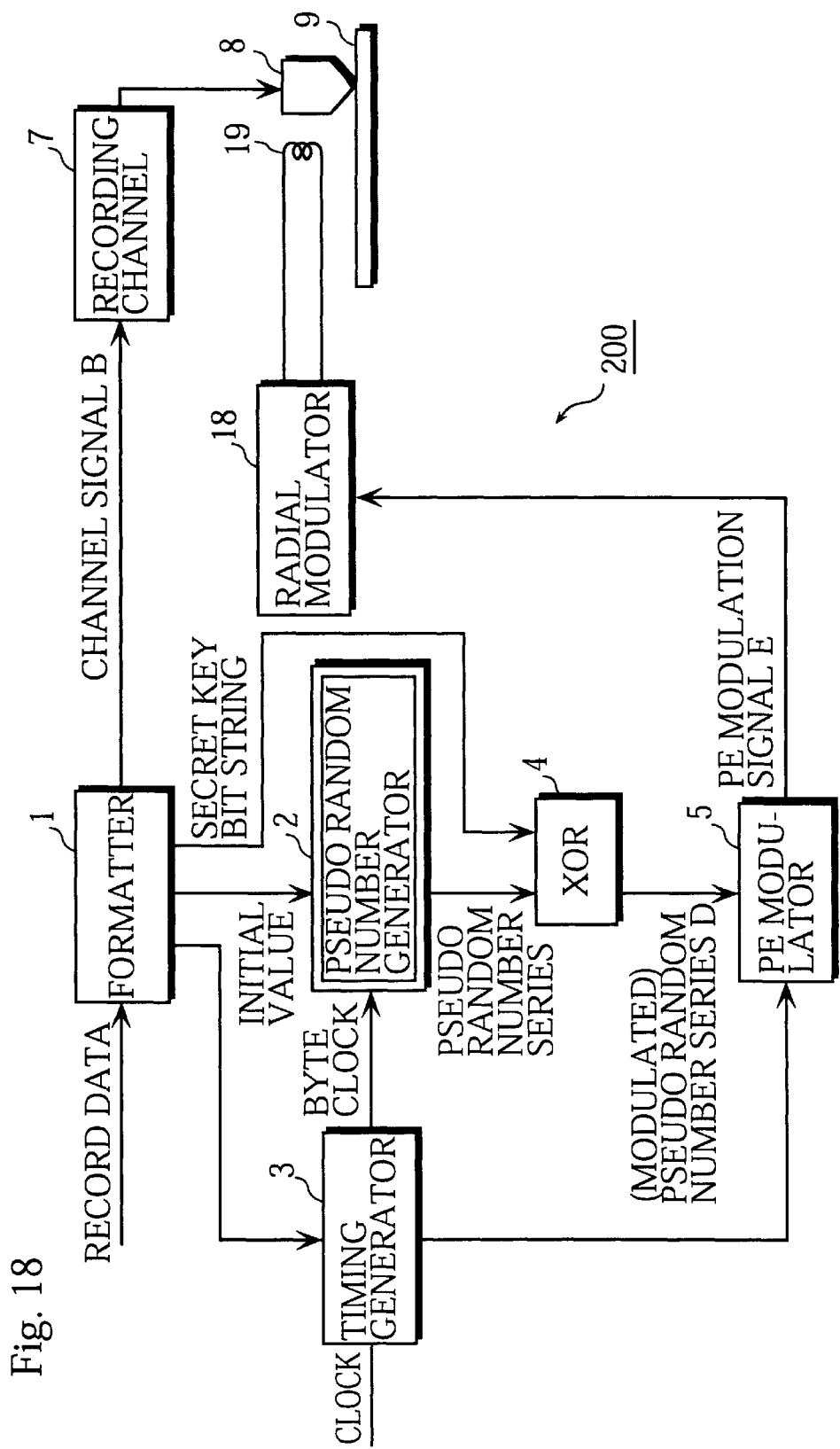
FIG. 18 is a block diagram showing the construction of an optical disc recording apparatus of a second embodiment of the present invention.

FIG. 18 is a block diagram showing the characteristic parts of an optical disc recording apparatus 200 of the second embodiment. Note that the waveforms of main signals B, D, and E in FIG. 18 are shown in the timing chart in FIG. 19. Also, the double rectangle enclosing a block in FIG. 18 means that the construction elements of the block are confidentially mounted.

The optical disc recording apparatus 200 is a DVD-ROM recording apparatus having a unique function. That is, the optical disc recording apparatus 200 not only records primary digital information by forming recording marks at discrete reference positions on a track of an optical disc, but the optical disc recording apparatus 200 also embeds hidden-information, such as watermarks (a 56-bit secret key, in this second embodiment), into the primary digital information as secondary digital information by forming the recording marks at positions that are displaced in a radial direction (toward at least one of the inner periphery and the outer periphery) of a DVD 9. It should be noted here that the formation of recording marks at positions that are displaced in the radial direction is hereinafter referred to as the "radial modulation". To do so, the optical disc recording apparatus 200 includes a formatter 1, a pseudo random number generator 2, a timing generator 3, an XOR gate 4, a PE modulator 5, a radial modulator 18, a tracking actuator 19, a recording channel 7, and a recording head 8.

Figure 1:
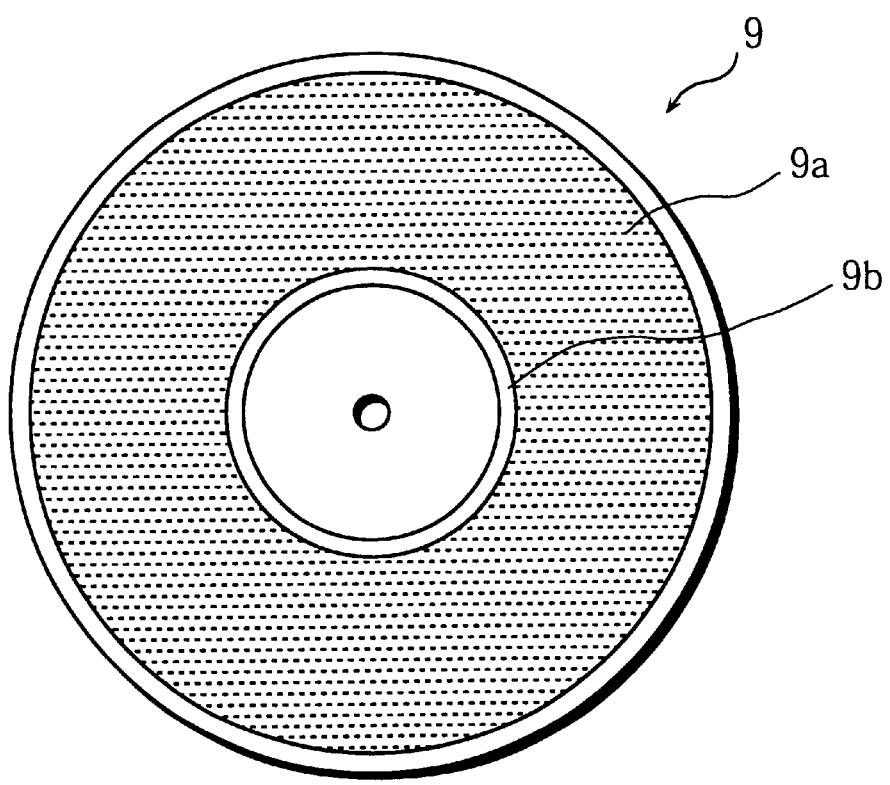
FIG. 1 shows recording areas of a DVD based on a conventional technique.

It should be noted here that the construction elements of the second embodiment that are the same as those of the first embodiment are assigned the same numbers as in FIG. 1. Therefore, the following description centers on the unique aspects of the second embodiment.

The radial modulator 18 generates a signal for displacing the recording head 8 toward the inner periphery or the outer periphery of the DVD 9 by a fixed slight amount according to the PE modulation signal E outputted from the PE modulator 5. That is, the radial modulator 18 performs the radial modulation. The radial modulator 18 then outputs the signal for displacing the recording head 8 to the tracking actuator 19. As a result, each recording mark formed in synchronization with the channel signal B is displaced from the track center toward the inner periphery or the outer periphery (that is, inward or outward) by the fixed slight amount.

It should be noted here that the slight amount described above is preset to fall within the range of a radial error (the deviation in each pit position from the track center in the radial direction) occurring when an ordinary reproducing apparatus reproduces (performs a push-pull reproduction on) an ordinary DVD onto which only primary digital information has been recorded. More specifically, the slight amount is preset as a value (0.01 μm, for instance) that is no more than 2% of the beam spot as determined by λ/NA, where λ is the wavelength of the laser beam irradiated by the recording head 8 (0.65 μm, for instance) and NA is the numerical aperture of the lens (0.6, for instance).

The radial modulator 18 displaces the recording head 8 toward the inner periphery by the slight amount from the track center if the PE modulation signal E is "1", and the radial modulator 18 displaces the recording head 8 toward the outer periphery by the slight amount if the PE modulation signal E is "0". While the phase modulator 6 of the first embodiment shifts the positions of two edges that determine the length of a recording mark, the radial modulator 18 of the second embodiment shifts the position of a recording mark (the positions of two edges that determine the width of the recording mark) in the radial direction. In this manner, the secondary digital information is recorded.

The recording channel 7 generates a control signal for controlling the irradiation (ON/OFF) of a laser beam onto the DVD 9 in synchronization with the changes (1/0) in the channel signal F outputted from the phase modulator 6, and outputs the control signal to the recording head 8. The recording head 8 forms pits on the DVD 9 according to the control signal outputted from the recording channel 7 and the drive signal outputted from the radial modulator 18 via the tracking actuator 19. More specifically, the recording head 8 spirally directs a beam spot (irradiates the laser beam) on the rotating DVD surface according to the control signal and the drive signal. During the irradiation of the laser beam, the recording head 8 is displaced by the slight amount in the radial direction.

Figure 19:
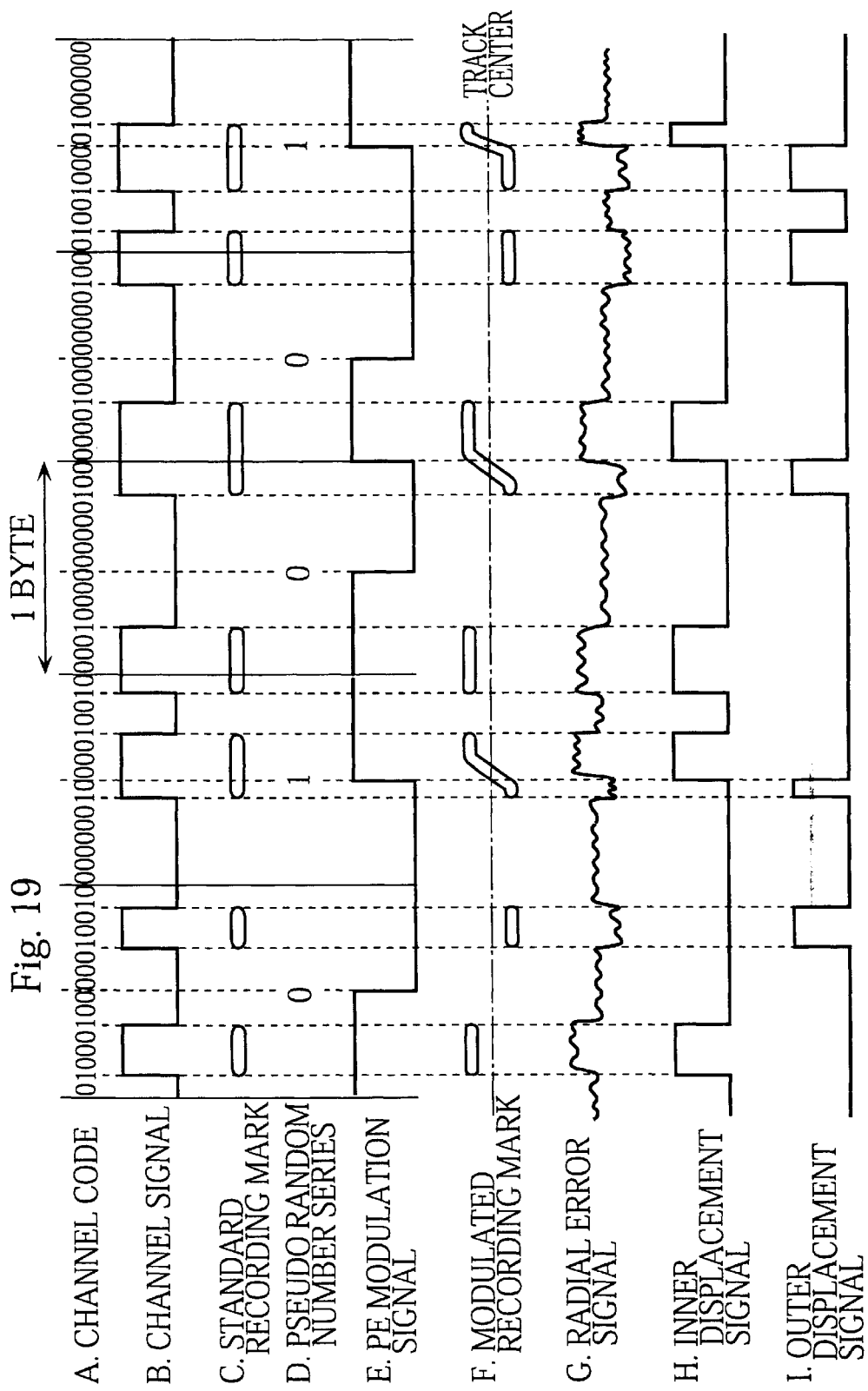
FIG. 19 is a timing chart showing main signals which are related to the operation of the optical disc recording apparatus of the second embodiment.

In this manner, as shown in the timing chart in FIG. 19, modulated recording marks F that are represented by optically readable pits (lands or grooves) are formed on the DVD 9. As can be understood by comparing the standard recording marks C and the modulated recording marks F in FIG. 19, the modulated recording marks F formed by the optical disc recording apparatus 200 equate to the standard recording marks C that are each entirely or partially displaced in the radial direction.

Figure 20:
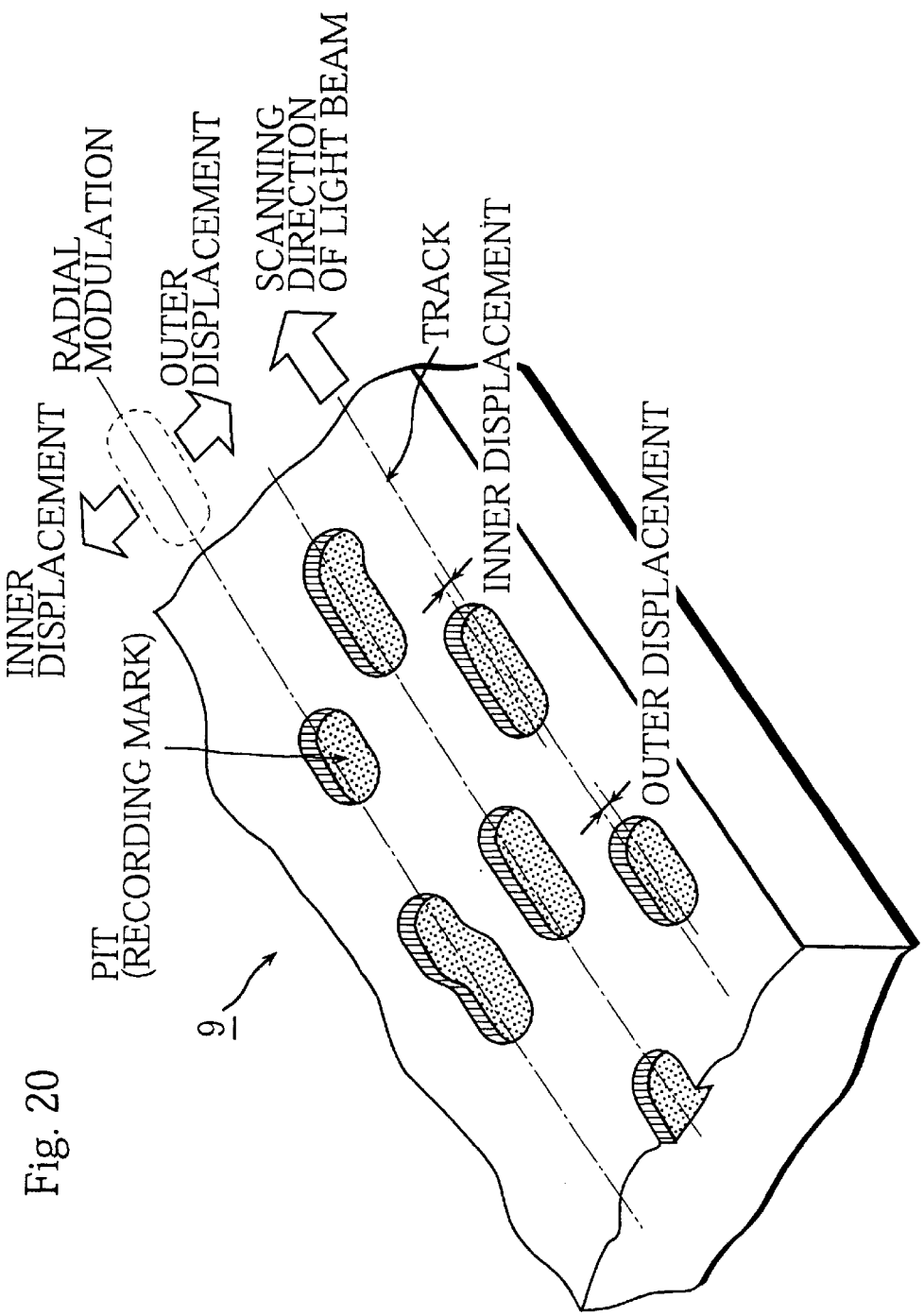
FIG. 20 shows the surface of a DVD on which pits have been formed by the optical disc recording apparatus of the second embodiment.

FIG. 20 shows the surface of the recording layer of the DVD 9 on which pits (recording marks) have been formed in the manner as described above. The position of each pit that is formed in the secret key recording mode is displaced in the radial direction (toward the inner periphery or the outer periphery) from the pit position used in a non-secret key recording mode by a displacement amount corresponding to the fixed slight amount. It should be noted here that, as described above, the slight amount is set to be lost in noise that occurs during reproduction, and the actual position of each pit is not so prominently displaced as shown in FIG. 20. That is, the shape of each modulated recording mark F and the waveform of the radial error signal G shown in FIG. 19 and the shape and displacement amount of each pit shown in FIG. 20 are exaggerated for purposes of illustration.

Figure 21:
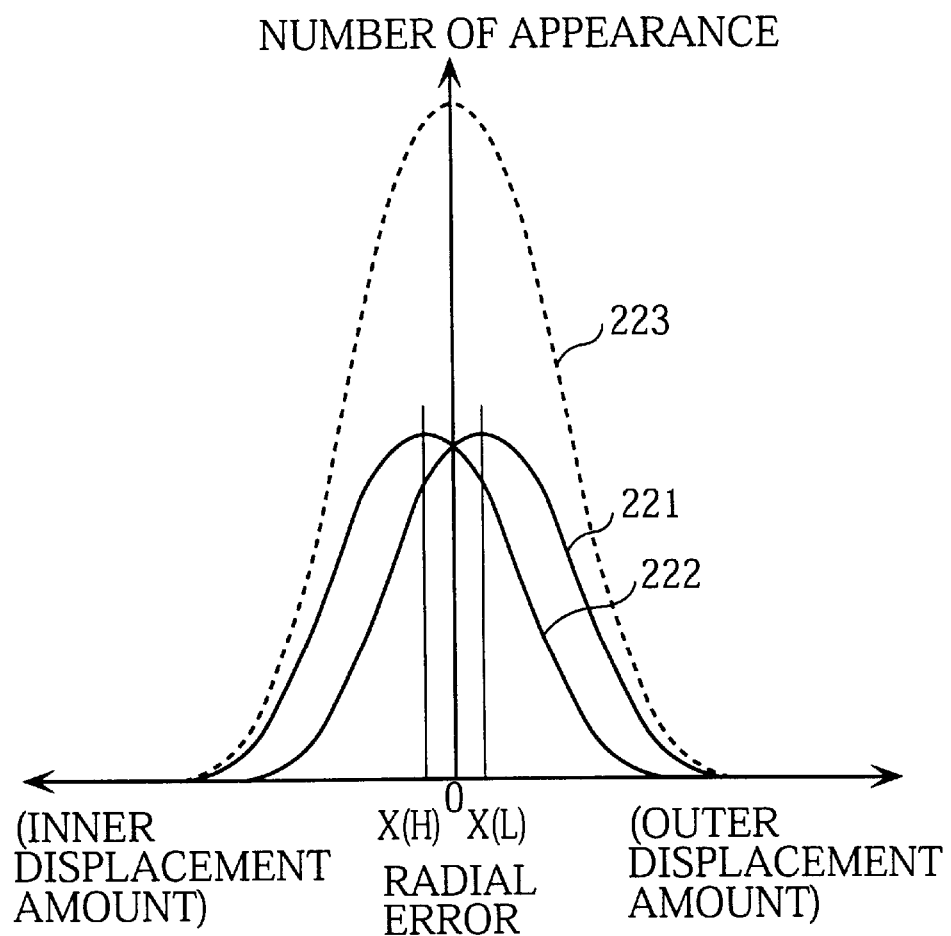
FIG. 21 is a graph showing the distribution of radial errors observed for pits that are formed by the optical disc recording apparatus of the second embodiment.

FIG. 21 is a graph showing the distribution of radial errors observed for pits formed in the secret key recording mode as described above, that is, modulated recording marks F obtained as a result of the radial modulation.

The curve 221 shows the distribution of radial errors that are observed for the modulated recording marks F formed when the PE modulation signal E is "0". As shown in FIG. 21, the curve 221 resembles a Gaussian curve whose peak appears at the point X(L) where the recording mark is displaced toward the inner periphery by the displacement amount. The curve 222 shows the distribution of radial errors that are observed for the modulated recording marks F formed when the PE modulation signal E is "1". As shown in FIG. 21, the curve 222 resembles a Gaussian curve whose peak appears at the point X(H) where the recording mark is displaced toward the outer periphery by the displacement amount. The curve 223 shows a radial error distribution obtained by combining the curves 221 and 222.

The present invention is based on the principle that the radial error distribution represented by the curve 223 can be separated into the distributions shown by the curves 221 and 222 by performing a synchronous detection using a pseudo random number series that is the same as that used to record the secret key.

The DVD 9 onto which the optical disc recording apparatus 200 has embedded the 56-bit secret key has the following feature.

The secret key is recorded by performing a radial modulation in which the position of each recording mark is displaced by a slight amount in a direction perpendicular to the track direction (in the radial direction). Therefore, the secret key cannot be read by an ordinary reproducing apparatus that only performs a push-pull detection and thus is unable to read information hidden within noise.

Consequently, even if the entire content of a DVD on which a secret key has been recorded in the manner as described above is read by an ordinary reproducing apparatus and is recorded onto another DVD, only the primary digital information is copied and the secondary digital information (secret key) hidden within noise is not copied. This makes it possible to distinguish original DVDs from DVDs that are duplicated without proper authorization. As a result, copyright infringements by pirated DVDs can be avoided, for instance, by providing a reproducing apparatus with a function of allowing the reproduction of only DVDs that include secret keys.

The optical disc recording apparatus 200 does not record the 56-bit secret key onto a DVD as it is but records 256-bit sections of the random number series, which each correspond to one bit of the secret key, onto a DVD. That is, the information hidden within noise is not a bit string of the secret key but a random number series that indirectly indicates the secret key. This makes it difficult to crack the secret key and thereby enhances the confidentiality of the secret key.

Furthermore, to perform the radial modulation on recording marks corresponding to the channel signal B, the optical disc recording apparatus 200 does not use the random number series as it is, but the optical disc recording apparatus 200 uses the PE modulation signal E that is obtained by subjecting the random number series to the PE modulation. As a result, a modulation (1) for displacing a recording mark toward the inner periphery and a modulation (0) for displacing a recording mark toward the outer periphery are performed with equal probability for each 1-byte record data (each channel code). More specifically, one of these modulations is performed for the phase range "0–180°" of a 1-byte record data and the other of these modulations is performed for the phase range "180–360°" of the record data. This makes the push-pull detection stable during reproduction of the optical disc.

If these displacements are not performed with equal probability, an offset is generated for a push-pull signal (usually used to perform a tracking servo detection), and the servo will be driven to a position away from the track center. This makes the amplitude of the radial error signal (a signal showing the amount of deviation in each recording mark position from the track center in the radial direction) small and reduces the sensitivity for detecting radially modulated components. As described above, however, the optical disc recording apparatus 200 performs the radial modulation by using the PE modulation signal E so that such a problem will not arise in this second embodiment.

In the present embodiment, the PE modulator 5 is used to generate the displacement of each recording mark in the radial direction. The term "PE (Phase Encoding)" originally means the displacement of a phase in the jitter direction and does not mean the displacement in the radial direction that is perpendicular to the jitter direction. However, in the second embodiment, the displacements in the radial direction can be performed with a circuit having the same construction as the PE modulator 5 of the first embodiment. Therefore, the second embodiment is described by using the same wording as the first embodiment.

Also, as described in the first and second embodiments, the PE modulation signal in the optical disc recording apparatus of the present invention changes between "0" and "1". Especially note that the PE modulation signal "0" does not means a situation where the PE modulation is not performed, that is, a situation where information for protecting copyrights is not included. To form a track which does not include copyright protection information, it is required to prevent pit edges from being displaced in the jitter direction or the radial direction. This means that another value ("Z", for instance) is required to form such a track.

Optical Disc Reproducing Apparatus

The following is a description of a reproducing apparatus that is compatible with a DVD onto which a secret key has been recorded in the manner as described above.

Figure 22:
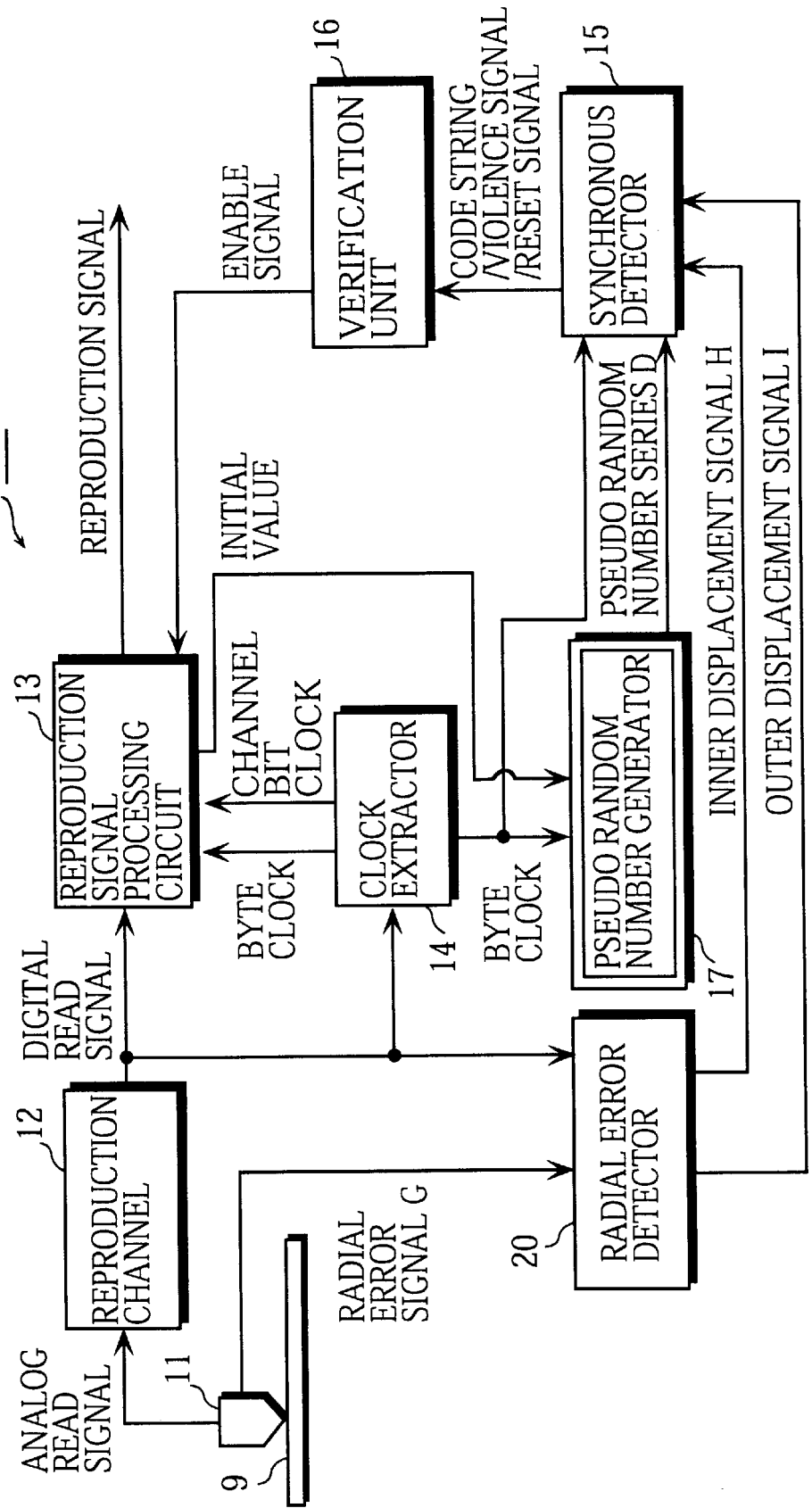
FIG. 22 is a block diagram showing the construction of an optical disc reproducing apparatus of the second embodiment of the present invention.

FIG. 22 is a block diagram showing the construction of the characteristic parts of an optical disc reproducing apparatus 210 of the second embodiment. Note that the waveform of the radial error signal G in FIG. 22 is conceptually the same as that shown in the timing chart in FIG. 19. As described above, however, the radial error signal G is hidden within noise and is not so clearly detected as the waveform shown in FIG. 19.

The optical disc reproducing apparatus 210 is a DVD reproducing apparatus corresponding to the optical disc recording apparatus 200. That is, the optical disc reproducing apparatus 210 not only reproduces primary digital information according to the position of each recording mark on a DVD in the track direction, but the optical disc reproducing apparatus 210 also detects secondary digital information (a secret key) hidden within noise of the radial error signal that is observed during the reproduction of the primary digital information. The optical disc reproducing apparatus 210 protects the copyright on the DVD according to the detection result of the secondary digital information. To do so, the optical disc reproducing apparatus 210 includes a reproduction head 11, a reproduction channel 12, a reproduction signal processing circuit 13, a clock extractor 14, a synchronous detector 15, a verification unit 16, a pseudo random number generator 17, and a radial error detector 20.

The reproduction head 11 is an optical pickup. That is, the reproduction head 11 condenses and irradiates a light beam onto the recording marks on the rotating DVD 9, generates the radial error signal G from the reflected light, and outputs the radial error signal G to the radial error detector 20. Here, the radial error signal G shows the displacement amount of each modulated recording mark F from the track center in the radial direction.

Figure 23:
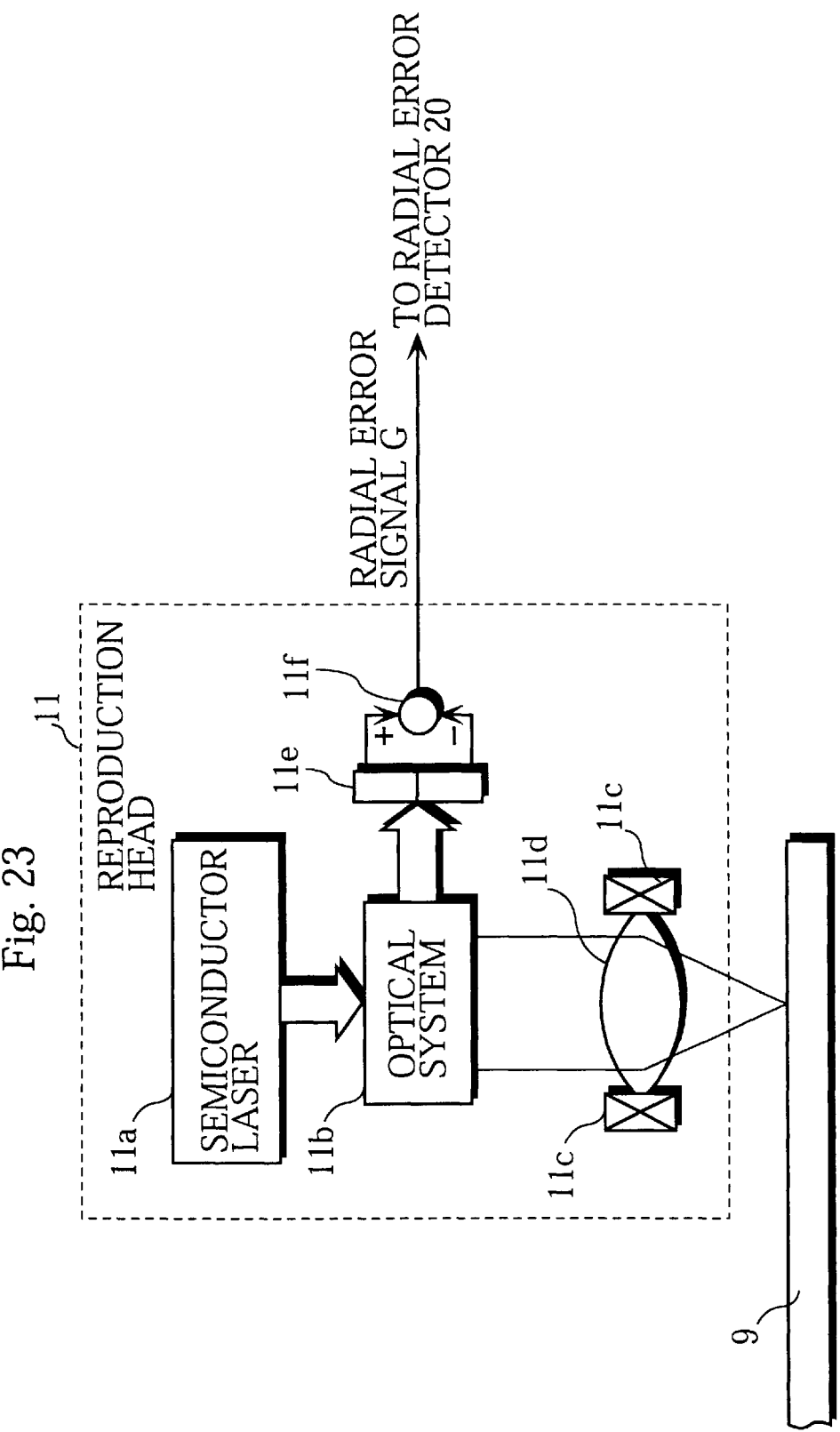
FIG. 23 is a block diagram showing the detailed construction of part of a reproduction head of the optical-disc reproducing apparatus of the second embodiment that relates to the generation of a radial error signal.

FIG. 23 is a block diagram showing the detailed construction of part of the reproduction head 11 that relates to the generation of the radial error signal G. In the reproduction head 11, the light beam emitted from a semiconductor laser 11a is converted into parallel rays by the optical system 11b, and the parallel rays are condensed by an objective lens 11d to form a light beam spot that irradiates the DVD 9.

Reflection light that is reflected and diffracted in the radial direction of the DVD 9 is converted into parallel light by the objective lens 11d. The parallel light is then separated from the incident light in the optical system 11b, is irradiated onto two separate photo detectors 11e, and is converted by the photo detectors 11e into two electric signals. One of these electric signals represents the displacement amount of each modulated recording mark F that is displaced toward the inner periphery, and the other electric signal represents the displacement amount of each modulated recording mark F that is displaced toward the outer periphery. These electric signals are then inputted into a differential calculating unit 11f, which then converts the electric signals into the radial error signal G by showing the differences between the displacement amounts represented by the electric signals. The radial error signal G obtained in this manner is inputted into the radial error detector 20.

The radial error detector 20 is a demodulator corresponding to the radial modulator 18 of the optical disc recording apparatus 200. That is, the radial error detector 20 generates an inner displacement signal H and an outer displacement signal I by demodulating the radial error signal G outputted from the reproduction head 11 by using the digital read signal outputted from the reproduction channel 12 as a synch signal.

The radial error detector 20 then outputs these signals H and I to the synchronous detector 15. The inner displacement signal H indicates that the position of a modulated recording mark F is displaced from the track center toward the inner periphery, and the outer displacement signal I indicates that the position of a modulated recording mark F is displaced from the track center toward the outer periphery. Here, if normally occurring noise (radial errors that are not caused by the radial modulation) is not included, the inner displacement signal H and the outer displacement signal I have the waveforms shown in the timing chart in FIG. 19. That is, the inner displacement signal H is a logic signal showing the displaced part of each modulated recording mark that is partially or entirely displaced toward the inner periphery. Also, the outer displacement signal H is a logic signal showing the displaced part of each modulated recording mark that is partially or entirely displaced toward the outer periphery.

Figure 24:
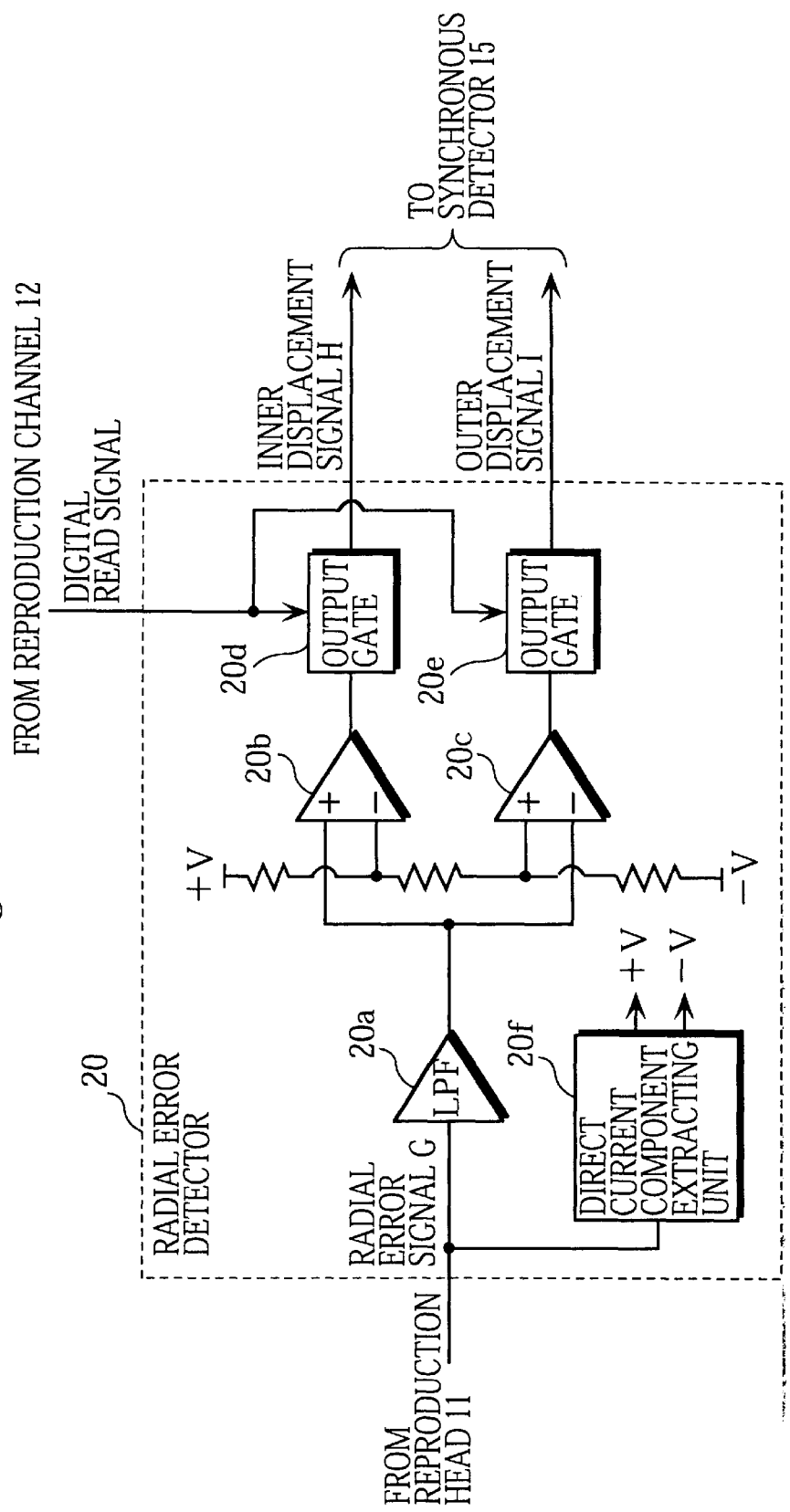
FIG. 24 is a block diagram showing the detailed construction of a radial error detector of the optical disc reproducing apparatus of the second embodiment.

FIG. 24 is a block diagram showing the detailed construction of the radial error detector 20. As shown in FIG. 24, the radial error detector 20 includes an LPF (lowpass filter) 20a, two comparators 20b and 20c, two output gates 20d and 20e, and a direct current component extracting unit 20f.

The direct current component extracting unit 20f extracts direct current components showing a track center from the radial error signal G outputted from the reproduction head 11, and the direct current component extracting unit 20f generates two reference voltages (±V) according to the extracted direct current components. These reference voltages are used to generate comparison reference voltages that are inputted into the comparators 20b and 20c.

The LPF 20a eliminates the high frequency noise that is included in the radial error signal G outputted from the reproduction head 11, and the LPF 20a outputs the radial error signal from which the high frequency noise has been eliminated to the comparators 20b and 20c. The comparators 20b and 20c judge (determine) whether the radial error signal has an amplitude that is outside the range between the positive and negative comparison reference voltages. The comparison reference voltages are threshold values for judging (determining) whether the position of each modulated recording mark F is significantly displaced from the track center toward the inner periphery or the outer periphery. For instance, the comparison reference voltages are set so as to correspond to the positions that are displaced from the track center by ±0.005 µm. As a result, displacements of recording marks from the track center by the slight amount described above (±0.01 µm) can be detected.

The output gates 20d and 20e respectively pass the outputs from the comparator 20b and the comparator 20c only while the reproduction channel 12 is detecting the modulated recording marks F.

The clock extractor 14 of the optical disc reproducing apparatus 210 extracts two types of clock data according to the read signal outputted from the reproduction channel 12. More specifically, the clock extractor 14 extracts a channel bit clock that is synchronized with each bit composing the channel code, and the clock extractor 14 extracts a byte clock that is synchronized with each byte of record data in the read signal. The clock extractor 14 then outputs the channel bit clock to the reproduction signal processing circuit 13, and the clock extractor 14 outputs the byte clock to the reproduction signal processing circuit 13, the synchronous detector 15, and the pseudo random number generator 17.

The reproduction signal processing circuit 13, the pseudo random number generator 17, the synchronous detector 15, and the verification unit 16 have the same functions as those of the first embodiment. The synchronous detector 15 is a circuit for detecting correlations between (i) the pseudo random number series outputted from the pseudo random number generator 17, and (ii) the inner displacement signal H and the outer displacement signal I outputted from the radial error detector 20. The synchronous detector 15 then informs the, verification unit 16 of the correlation that is detected for each 1-bit random number (a positive correlation, a negative correlation, or no correlation).

In the first embodiment, the phase modulation is performed and the secondary digital information (key information) is embedded by displacing the edges of recording marks in the track direction. On the other hand, in the second embodiment, the radial modulation is performed and the secondary digital information is embedded by displacing the positions of recording marks in the radial direction. Because the phase error signal (the advanced phase signal and the delayed phase signal) in the first embodiment equates to the radial error signal (the inner displacement signal and the outer displacement signal) in the second embodiment, the same copyright protection system as the first embodiment can thereby be achieved in the second embodiment.

The advantage of the second embodiment is that almost the same effect as the first embodiment can be achieved at lower cost by using slower circuits than the first embodiment. As can be understood from the operations of the circuits used in the first embodiment, such as the phase error signal separator 14f for detecting the variation in jitter, these circuits need to operate at a speed no less than the channel clock rate as well as with high precision in the direction of a time axis.

On the other hand, the differential calculating unit 11f and the radial error detector 20 of the second embodiment are merely variations on a differential amplifier, and therefore, it is enough for these circuits to operate at a speed corresponding to the incidence of the modulated recording marks F, that is, at the rate of the channel signal.

The recording medium, recording apparatus, and reproducing apparatus related to the jitter modulation and radial modulation of the present invention have been described above with an explanation of the first and second embodiments, although it should be obvious that the present invention is not limited to these embodiments.

In the first and second embodiments, a pseudo random number series of 256×56 bits that has been logically inverted in response to one 56-bit secret key is embedded into record data of 56 successive bytes. However, a plurality of pseudo random number series, starting from two or more initial values, may be generated for record data in specific areas or record data of a number of bytes related to the physical recording structure, such as ECC blocks, sectors, and frames, and may be embedded into a plurality of areas.

In the first and second embodiments, if it is successively confirmed 56 times (for each 256-bit section of the pseudo random number series) that there is a positive or negative correlation between the phase error signal and the pseudo random number series, it is determined that the DVD 9 is an authorized DVD. However, the authenticity of the DVD 9 may be verified by checking whether fifty correlations exist between the phase error signal and the pseudo random number series of 256×56 bits. As shown in FIGS. 9 and 21, the distributions of jitter and radial errors include some degree of variations. Therefore, depending on the number of pulses and the displacement amounts according to which the correlation judgement is performed, it is more appropriate to judge (determine) whether significant correlations exist according to a judgement (determination) criterion with some degree of variation.

In the first and second embodiments, the reproduction of primary digital information is prohibited if the degree of matching between the code string outputted from the synchronous detector and the secret key does not exceed a predetermined threshold value. However, this operation may be performed without the secret key. If the phase error signal or the displacement signal integrated by the synchronous detector exceeds a threshold value, it is determined that there is a strong correlation, and the reproduction is thereby allowed. In this case, the apparatus construction can be simplified without causing a significant loss to the effects of the present invention.

In the first and second embodiments, it is determined whether there is a correlation by integrating pulse areas in analog form during the synchronous detection of the phase error signal or the displacement signal. However, to simplify circuit constructions, the number of pulses may be added and subtracted (increased or reduced), and the calculation result may be counted in digital form.

In the first and second embodiments, the jitter modulation and the radial modulation are performed on record data to be recorded into the user information area 9a of the DVD 9. However, these modulations may be performed on the secret key to be stored in the control information area 9b. Therefore, the modulation of the present invention may be used in combination with a conventional content encryption method. For instance, the jitter modulation or the radial modulation may be performed during the recording of a disc key or title key into the control information area 9b. In this case, unauthorized copying like pirating can be prevented, which is to say that copyrights can be protected, with more reliability without having to change contents (digital information) that are recorded with the content encryption method.

In the first and second embodiments, the optical disc reproducing apparatus outputs the reproduction signal that is obtained after demodulation only if it is confirmed that a secret key is embedded into the DVD 9. However, the present invention is not limited to these embodiments. For instance, if the authenticity of the DVD 9 cannot be verified, the reproduction of only a title that is recorded in a specific area of the DVD 9 may be permitted.

In the first and second embodiments, the secret key used as the secondary digital information is prestored in each of the optical disc recording apparatus and the optical disc reproducing apparatus. These apparatuses may be modified so that the prestored secret key can be changed by receiving a user's designation or by performing confidential communication with an external device.

In the first and second embodiments, the jitter modulation of the present invention is used to embed the secondary digital information into an optical disc as hidden information. However, the present invention is not limited to these embodiments, and the modulation of the present invention may be used for various purposes other than encryption. For instance, the jitter modulation may be used to write audio information (corresponding to secondary digital information) into a recording medium along with picture information (corresponding to primary digital information). That is, the present invention may be used to increase the recording density by recording various types of digital information into a single recording medium in a manner that enables the information to be separated during reproduction.

In the second embodiment, the tracking actuator 19 is used to perform the radial modulation. However, an AO (Acoustic Optical) deflection element may be used instead to deflect a laser beam in the radial direction, which is to say toward the inner periphery or the outer periphery, by a slight amount.

Third Embodiment

The third embodiment of the present invention is described below with reference to the drawings.

Figure 25:
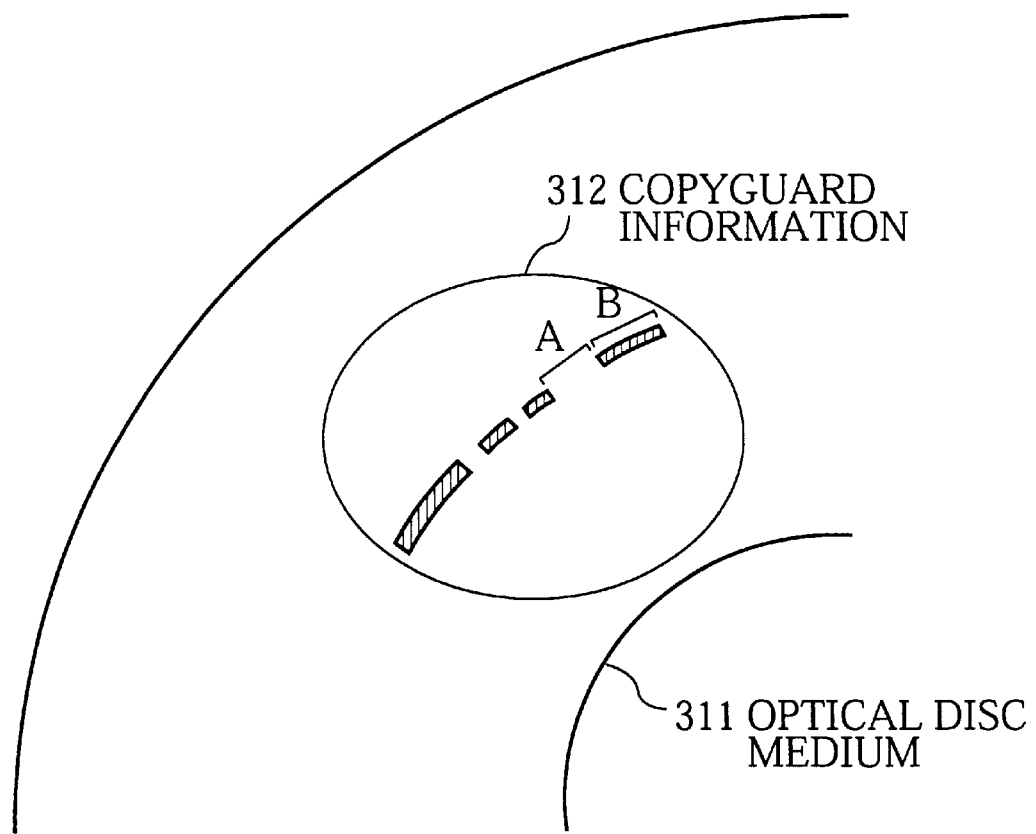
FIG. 25 shows the construction of data recorded onto an optical disc of a third embodiment of the present invention.

FIG. 25 shows the construction of data that are recorded onto an optical disc 311 of the third embodiment. As shown in FIG. 25, copyguard information 312 is recorded onto the optical disc 311. This information 312 is recorded by locally performing a phase modulation on a reference clock and by forming pits and lands with reference to the phase-modulated clock. That is, some data strings that are recorded onto the optical disc 311 are moderately out of sync with a reference channel clock. Therefore, the phases of these data strings deviate from the reference clock and a large amount of jitter is detected for the data strings during reproduction.

The third embodiment resembles the first embodiment in that secondary digital information (the copyguard information 312) is embedded by locally displacing phases of the reference clock by a displacement amount no more than the amount of jitter that occurs during reproduction. However, the third embodiment differs from the second embodiment in that the displacement amount is not as small as the amount of noise.

Figure 26:
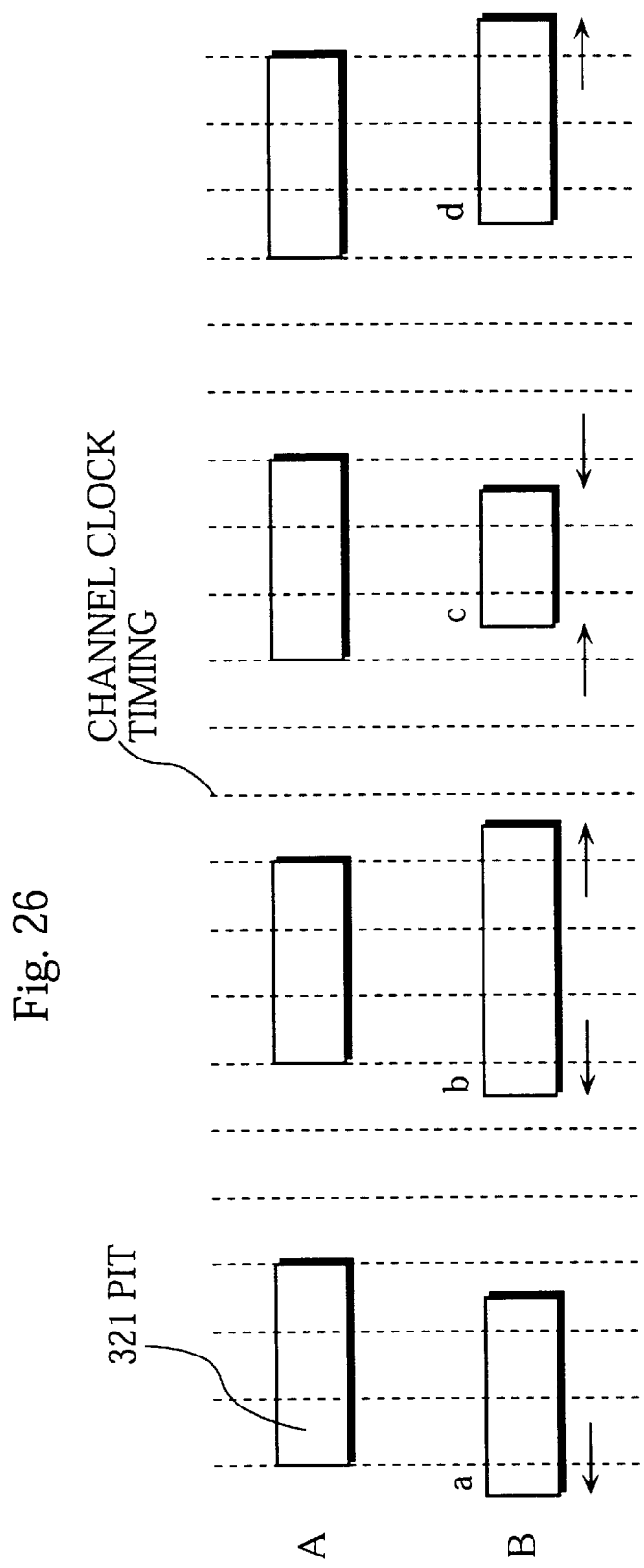
FIG. 26 shows the magnified views of areas A and B of the optical disc shown in FIG. 25.

In FIG. 25, an area A represents an area into which data is recorded with reference to the normal reference clock, while an area B represents an area into which data is recorded with reference to the phase-modulated clock. FIG. 26 is the magnified views of the areas A and B.

FIG. 26 shows the case where a 3T single signal is recorded in pits 321 that are formed in the areas A and B. In FIG. 26, the vertical dashed lines represent the reference channel clock timings. The pits in the area A have been formed at the timings of the reference clock so that the beginnings and ends of pits and lands are synchronized with the channel clock timings. On the other hand, the pits in the area B have been formed at the timings of the phase-modulated clock so that phase differences locally exist between (1) the beginnings and ends of pits and lands and (2) the rising edges and trailing edges of the channel clock.

Various phase modulation methods may be used in this embodiment. For instance, as shown in FIG. 26, phases may be shifted by a predetermined amount by cyclically performing a shift "a" for shifting both edges to the left, a shift "b" for shifting both edges outward, a shift "c" for shifting both edges inward, and then a shift "d" for shifting both edges to the right. Also, phases may be shifted in response to the phase shifts of the phase-modulated clock. For instance, a shift for shifting either edge to the right and a shift for shifting either edge to the left may be performed. Further, a clock signal may be subjected to a phase modulation by using random noise that is regulated by a predetermined variance. No matter which method is used to shift edges in the area B, the amount of jitter observed for the area B increases. Therefore, copyguard information can be described by using the variation in the jitter amount.

Figure 27:
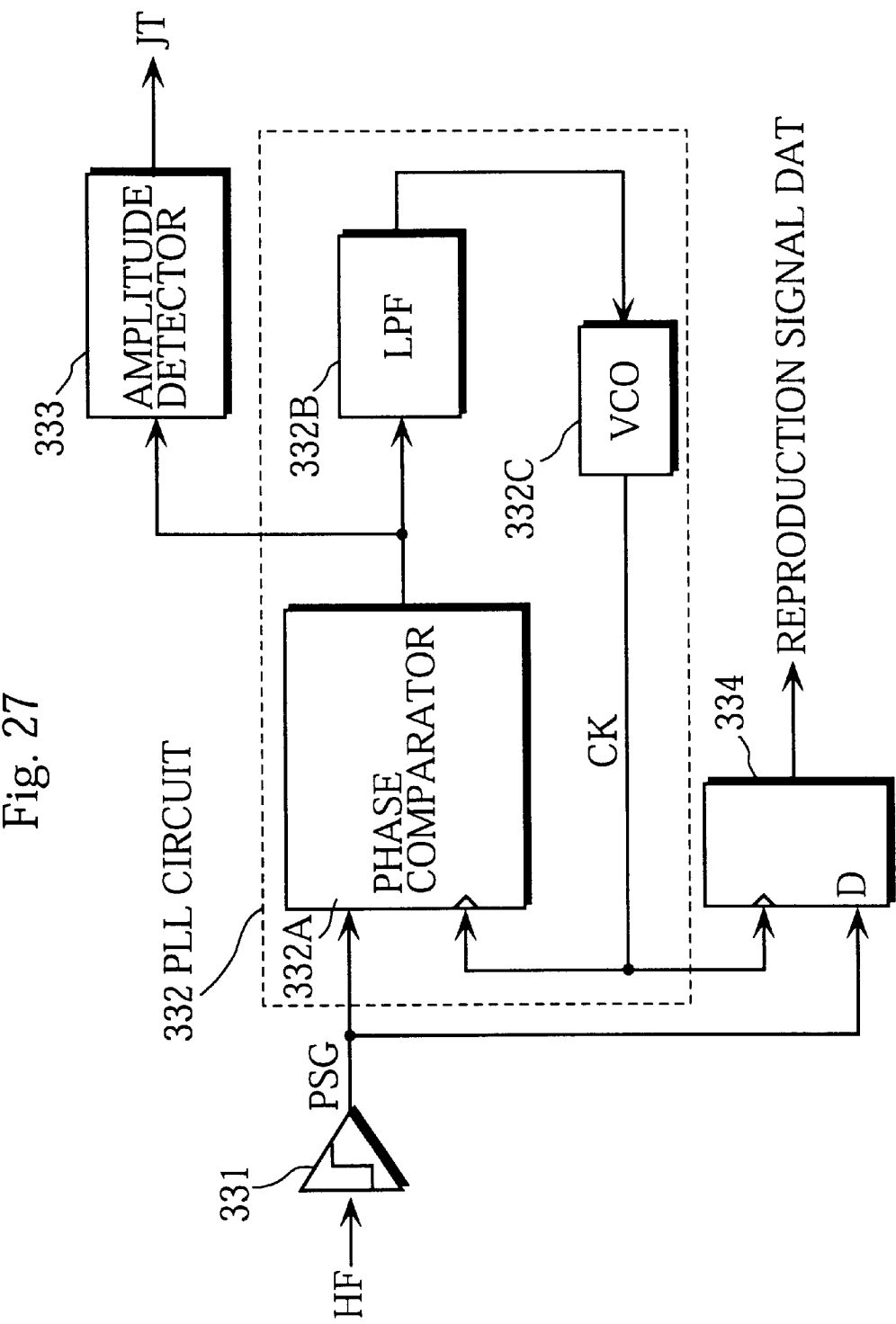
FIG. 27 is a block diagram of an optical disc apparatus of the third embodiment of the present invention.

FIG. 27 is the block diagram of an optical disc apparatus that includes an identification information detecting unit for detecting copyguard information according to the variation in the jitter amount. A reproduction signal HF is read from an optical disc by a reproduction head and is sent to a comparator 331. The comparator 331 binarizes the reproduction signal HF and supplies the binarized signal PSG to a PLL (Phase-Locked Loop) circuit 332. The PLL circuit 332 generates a system reference clock and a reproduction clock CK. A flip-flop 334 synchronizes the binarized signal PSG with reference to the reproduction clock CK. In this manner, a reproduction signal DAT is generated.

Figure 28:
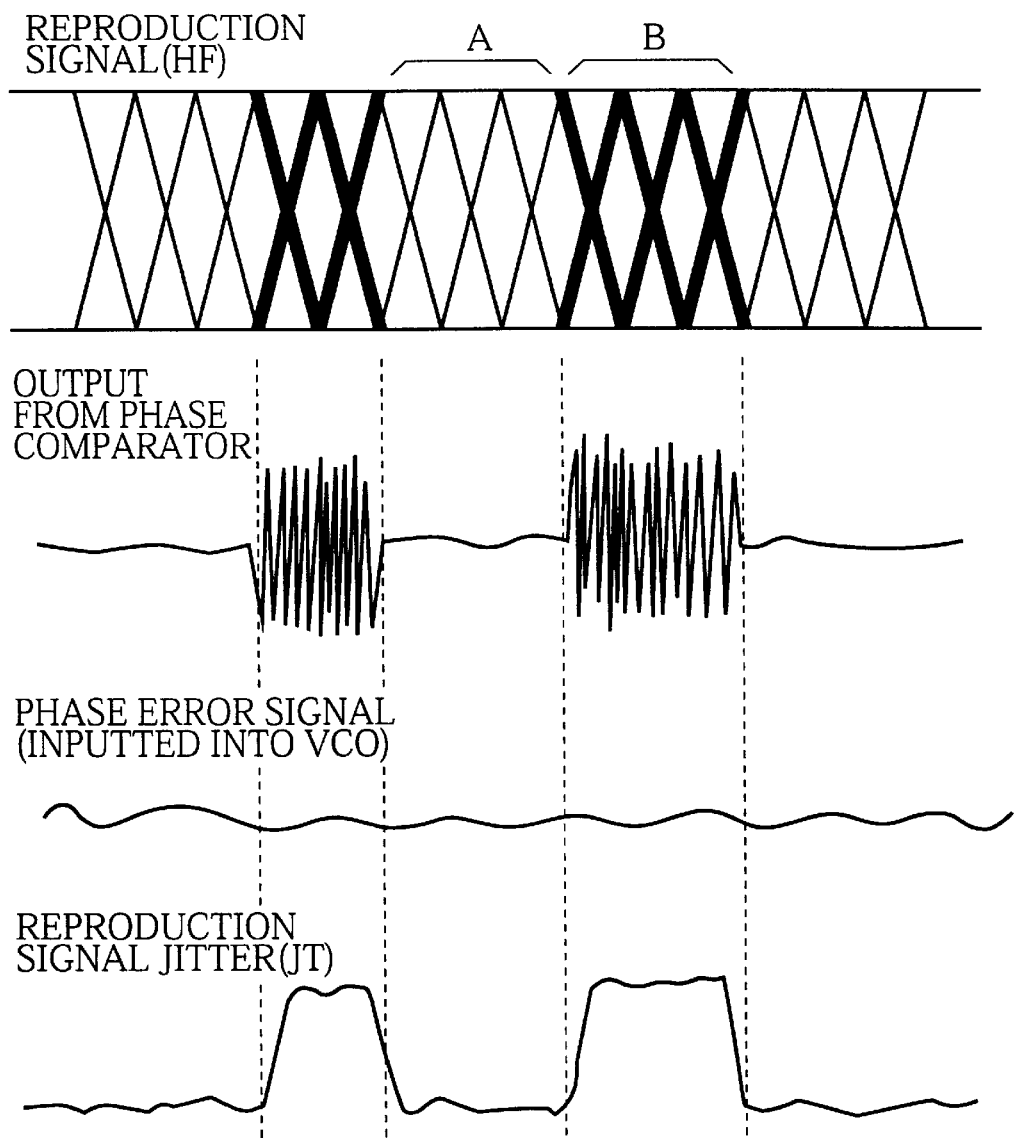
FIG. 28 is a timing chart showing the operation of the optical disc apparatus of the third embodiment shown in FIG. 27.

An example eye pattern of the reproduction signal HF is shown in FIG. 28. The reproduction signal obtained from the area A shown in FIG. 25, onto which data has been recorded at the reference clock timings, has an, eye pattern including a small amount of jitter that is caused by the noise in the reproduction channel and the distortion of waveforms. On the other hand, the reproduction signal obtained from the area B shown in FIG. 25, onto which data has been recorded at the phase-modulated reference clock timings, has an eye pattern where eye phases are partially shifted. Therefore, the amount of jitter that is observed for the reproduction signal from the area B is larger than the amount of jitter that is observed for the reproduction signal from the area A.

The PLL circuit 332 includes a phase comparator 332$a$, a LPF (lowpass filter) 332$b$, and a VCO (Voltage Controlled Oscillator) 332$c$. The phase comparator 332$a$ compares the phase of the reproduction clock CK sent from the VCO 332$c$ and the phase of the reproduction signal HF, and the phase comparator 332$a$ outputs the comparison result. The LPF 332$b$ generates a phase error signal by cutting high frequency components of the comparison result. The VCO 332$c$ generates the reproduction clock CK according to the phase error signal.

Here, to guarantee that the reproduction clock CK generated by the PLL circuit 332 does not follow the clock that has been locally phase-modulated, each phase shift that is caused by the phase modulation during recording needs to exceed the synchronization frequency band of the PLL circuit 332. Also, phases need to be shifted so that the mean value of phase errors outside the synchronization frequency band becomes "0". That is during the phase modulation, a recording apparatus must combine the edge shift patterns shown in FIG. 26 so that each phase shift exceeds the synchronization frequency band and so that the mean value of phase errors outside the synchronization frequency band becomes "0". In this case, all high frequency components included in the signal outputted from the phase comparator 332$a$ are eliminated by the LPF 332$b$, and therefore, the signal inputted into the VCO 332$c$ has a flat waveform, as shown in FIG. 28.

As a result, the PLL circuit 332 does not follow the phase-modulated clock and thereby stays synchronized with the normal reference clock. Therefore, phase errors (jitter) occur between the clock and the edges of the signal that is obtained from the area where the phase modulation has been performed. An amplitude detector 333 generates a signal corresponding to the amplitude of the signal that is outputted from the phase comparator 332$a$, that is, the amplitude of the phase error signal (the absolute value of each phase error) to be inputted into the LPF 332$b$. FIG. 28 shows the waveform of a reproduction signal jitter detection signal JT corresponding to the reproduction signal HF. The copyguard information can be detected according to the variation in the jitter detection signal JT.

One conceivable method for using the third embodiment to determine whether a disc has been legally produced is described below. During production, key information (keyword) that uniquely corresponds to the copyguard information embedded into jitter is written into the control information area of a disc as an ordinary binary information. During reproduction, the keyword that is obtained from reproduction data is compared with the identification information that is detected according to the variation in the jitter amount, and it is determined that the disc has been legally produced if there is a correlation between the keyword and the identification information.

During a normal reproduction operation of the optical disc 311 of the third embodiment, the signal PSG that is binarized by the comparator 331 is outputted at the timings of the reproduction clock CK generated by the PLL circuit 332, and the signal PSG is converted into the reproduction signal DAT.

Figure 29:
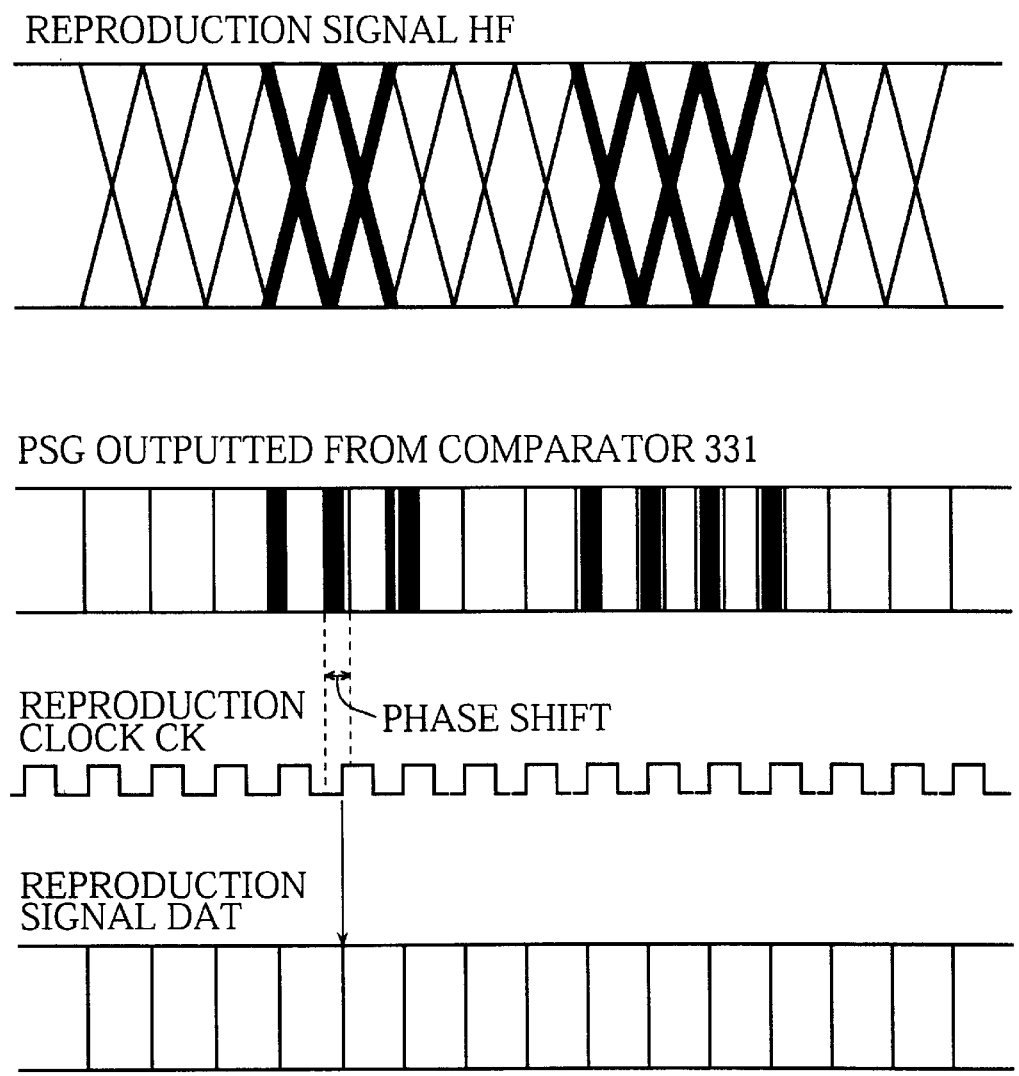
FIG. 29 is a timing chart showing the operation of the optical disc apparatus of the third embodiment shown in FIG. 27.

FIG. 29 is a timing chart showing the operation of the optical disc apparatus in FIG. 27. The reproduction signal HF partially includes phase shifts (jitter), and as a result, the binarized signal PSG also includes jitter. As described above, the PLL circuit 332 does not follow the phase shifts (jitter) and therefore generates a reproduction clock CK that does not include phase shifts. The reproduction signal DAT, from which jitter including the copyguard information has been eliminated, is generated by latching the binarized signal PSG that is outputted from the comparator 331 by using the flip-flop 334 at the timings of the reproduction clock CK.

Figure 30:
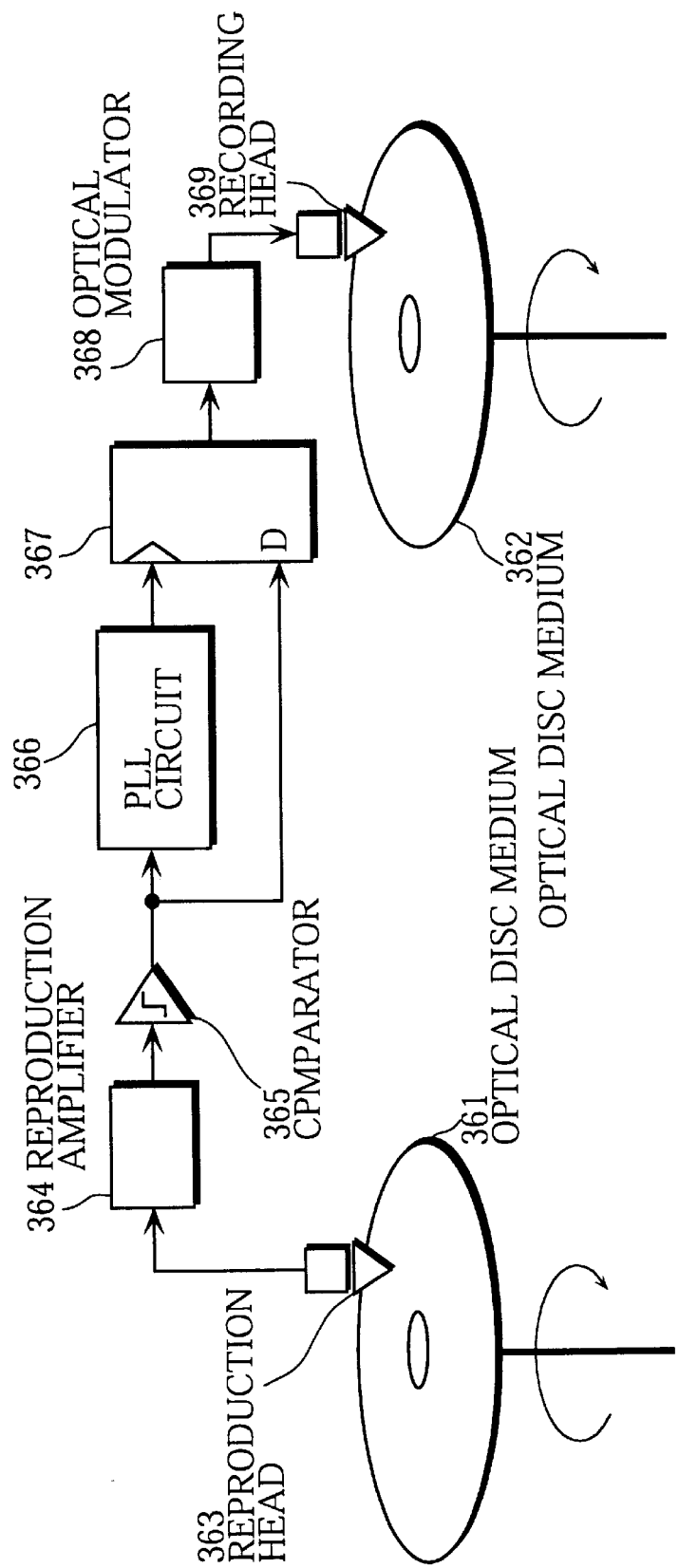
FIG. 30 is a block diagram of an apparatus that is ordinally used to duplicate optical discs.

A case where the illegal copying of a disc is performed by using the apparatus shown in FIG. 30 is described below. First, the rotation of the spindle motor used for an original optical disc 361 is brought into a perfect synchronization with the rotation of the spindle motor used for another optical disc 362 onto which the content of the original disc 361 is to be copied. Data is read from the original optical disc 361 by using a reproduction head 363, and the read data passes through a reproduction amplifier 364 and a comparator 365. A flip-flop 367 synchronizes the read data at the timing of a reproduction clock that is generated by a PLL circuit 366, and the flip-flop 367 outputs the synchronized data to a recording head 369 via an optical modulator 368. The synchronized data is written onto the optical disc 362 by the recording head 369. In this manner, optical discs onto which digitized contents have been recorded with a conventional technique are easily copied onto other optical discs using the apparatus in FIG. 30.

With the optical disc and the optical disc apparatus of the third embodiment, however, the copyguard information that has been described using jitter during the synchronization operation of the flip-flop 367 cannot be copied by merely copying a reproduction signal. This makes it possible to distinguish illegally duplicated optical discs from original discs.

The illegal copying of optical discs may be performed by bypassing the PLL circuit 366 and the flip-flop 367 and by directly recording the signal outputted from the comparator 365. In this case, the recorded signal includes the information hidden within jitter. Because the reproduction signal is not synchronized in this case, however, the noise jitter that occurs during signal reproduction is also recorded as it is. This means that the SN (signal-to-noise) ratio of the reproduction signal read from an optical disc that is duplicated in this manner falls, and the frequency of errors during the reproduction of the optical disc thereby increases. In particular, errors often occur in the reproduction signal read from a disc area, such as the area B described above, into which jitter has been intentionally recorded. This is because a reproduction signal that is obtained from such an area includes a large amount of jitter.

With the construction as described above, copyguard information is recorded by partially performing the phase modulation on the clock. Therefore, the copyguard information is recorded without affecting the reproduction quality during the normal reproduction of optical discs. Also, even if the optical disc of the third embodiment is illegally duplicated, the content of the duplicated disc lacks the copyguard information. This makes the illegal duplication of the optical disc very difficult. Also, in the third embodiment, an optical disc apparatus can easily detect the copyguard information by detecting the amplitude of the phase error signal from the PLL.

In the third embodiment, a phase-modulation is performed on the clock signal so as to record copyguard information. However, any other method may be used so long as pits including jitter, such as the pits shown on the lower level of FIG. 26, are formed. For instance, the rising and trailing edges of a bit stream of record information may be directly shifted by various delay amounts during the production of an optical disc. Even in this case, the object of the present invention is achieved.

It is preferable that the size of each added phase error is set so that sufficient detection sensitivity is guaranteed without increasing the frequency of errors in the reproduction signal. Therefore, it would be appropriate to set the phase error amount as around 1/8–1/4 of one clock cycle.

The function of the comparator 331 is not specified in the third embodiment. However, to achieve the object of the present invention, the comparator 331 must not follow the variation in a reproduction signal level caused by a local phase variation. In the case where the shifts "b" and "c" shown on the lower level of FIG. 26 have been performed, the instantaneously. If the comparator 331 automatically followed the variation in the reproduction signal level, the jitter in the binarized signal PSG would decrease, thereby resulting in lower sensitivity for detecting copyguard information. Accordingly, it is preferable that the comparator 331 has a synchronization frequency band that is equal to or narrower than the frequency band of the PLL circuit 332.

The first to third embodiments are based on DVD-ROMs. However, the present invention is not limited to these embodiments, and the present invention may be applied to other recording media, such as CD-ROMs and DVD-RAMs. Also, aside from recording media that record data on pits, the present invention may be applied to recording media that use phase changes and magnetization to record data so long as the positions of recording marks (corresponding to pits) can be displaced by performing the jitter modulation or the radial modulation.

The first embodiment relates to a copyright protection system that only uses the jitter modulation, the second embodiment relates to a copyright protection system that only uses the radial modulation, and the third embodiment relates to a copyright protection system that only uses the phase modulation which is not limited to a noise range. A copyright protection system, which achieves a high security level by recording lengthy secondary digital information onto an optical disc at a high recording density can be achieved by combining these modulations.

What is claimed is:

1. An optical disc on which primary digital information and secondary digital information are recorded, wherein:

the primary digital information is recorded as pits that are formed at discrete reference positions on a track;

the secondary digital information is recorded as deviations of slight amounts in positions of certain pits from corresponding reference positions;

each slight amount is within a range where pits that are formed on an optical disc on which only the primary digital information is recorded deviate from corresponding reference positions during reproduction;

the secondary digital information is recorded with a phase modulation where edges that determine lengths of the certain pits in a track direction are formed at positions whose phases are advanced and delayed by the slight amounts from corresponding positions when the certain pits are formed to record only the primary digital information; and each slight amount is constant and is within a range of jitter that is observed, during reproduction, for pits on an optical disc on which only the primary digital information is recorded.

2. The optical disc of claim 1, wherein the secondary digital information is recorded in a certain area of the optical disc, and, within the certain area, a total number of edges that are formed at positions whose phases are advanced is substantially equal to a total number of edges that are formed at positions whose phases are delayed.

3. The optical disc of claim 2, wherein, within the certain area, a modulation for advancing phases and a modulation for delaying phases are performed with equal probability for each unit code of the primary digital information.

4. An optical disc on which primary digital information and secondary digital information are recorded, wherein:

the primary digital information is recorded as pits that are formed at discrete reference positions on a track;

the secondary digital information is recorded as deviations of slight amounts in positions of certain pits from corresponding reference positions;

each slight amount is within a range where pits that are formed on an optical disc on which only the primary digital information is recorded deviate from corresponding reference positions during reproduction;

the secondary digital information is recorded with a radial modulation where each certain pit is formed at a position that is displaced by a slight amount either inward or outward from a track center in a radial direction; and each slight amount is constant and is within a range of position errors in the radial direction that are observed, during reproduction, for pits on an optical disc on which only the primary digital information is recorded.

5. The optical disc of claim 4, wherein the secondary digital information is recorded in a certain area of the optical disc, and, within the certain area, a total number of pits that are formed at positions displaced inward is substantially equal to a total number of pits that are formed at positions displaced outward.

6. The optical disc of claim 5, wherein, within the certain area, a modulation for displacing pits inward and a modulation for displacing pits outward are performed with equal probability for each unit code of the primary digital information.

7. An optical disc on which primary digital information and secondary digital information are recorded, wherein:
   the primary digital information is recorded as pits that are formed at discrete reference positions on a track;
   the secondary digital information is recorded as deviations of slight amounts in positions of certain pits from corresponding reference positions;
   the primary digital information is an information pit string that is formed in synchronization with a predetermined reference clock; and
   the secondary digital information is copyguard information represented by a pit string that is formed by locally adding phase errors to the predetermined reference clock.

8. The optical disc of claim 7, wherein a phase modulation is performed on the secondary digital information so that the secondary digital information is detected as jitter during a reproduction of the pit string.

9. The optical disc of claim 7, wherein a variation range of the phase errors substantially exceeds a synchronization frequency band of a PLL.

10. The optical disc of claim 7, wherein an average of phase shifts represented by the phase errors is zero.

11. The optical disc of claim 7, wherein the phase errors are caused by sequentially performing a first shift for shifting a beginning and an end of a pit by a same amount in a same direction and a second shift for shifting a beginning and an end of a pit by a same amount in opposite directions.

12. The optical disc of claim 7, wherein key information that correlates with the copyguard information is further recorded on the optical disc.

13. A recording apparatus for recording primary digital information and secondary digital information onto an optical disc by embedding the secondary digital information into the primary digital information, said recording apparatus comprising:
   a primary digital information recording means for recording the primary digital information by forming pits at discrete reference positions on a track of the optical disc; and
   a secondary digital information recording means for recording the secondary digital information by displacing positions of certain pits by slight amounts from corresponding reference positions;
   wherein each slight amount is within a range where pits on an optical disc on which only the primary digital information is recorded deviate from corresponding reference positions during reproduction;
   wherein said secondary digital information recording means records the secondary digital information with a phase modulation where edges that determine lengths of the certain pits in a track direction are formed at positions whose phases are advanced and delayed by the slight amounts from corresponding positions when the certain pits are formed to record only the primary digital information; and
   wherein each slight amount is constant and is within a range of jitter that is observed, during reproduction, for pits on an optical disc on which only the primary digital information is recorded.

14. The recording apparatus of claim 13, wherein the secondary digital information is to be recorded in a certain area of the optical disc, and
   said secondary digital information recording means performs the phase modulation so that, within the certain area, a total number of edges that are formed at positions whose phases are advanced is substantially equal to a total number of edges that are formed at positions whose phases are delayed.

15. The recording apparatus of claim 14, wherein, within the certain area, said secondary digital information recording means performs a modulation for advancing phases and a modulation for delaying phases for each unit code of the primary digital information with equal probability.

16. The recording apparatus of claim 15, wherein said secondary digital information recording means includes:
   a PE modulation unit for generating, according to the secondary digital information, a PE modulation signal that logically inverts at a center of each channel code in a part of the primary digital information to be recorded;
   a phase modulation unit for generating a modulated channel signal by advancing phases of certain edges in a channel signal by the slight amounts when the PE modulation signal shows a first state and by delaying phases of certain edges in the channel signal by the slight amounts when the PE modulation signal shows a second state, wherein each pair of edges in the channel signal shows a position of one pit of the primary digital information; and
   a writing unit for forming the certain pits on the optical disc according to the modulated channel signal.

17. A recording apparatus for recording primary digital information and secondary digital information onto an optical disc by embedding the secondary digital information into the primary digital information, said recording apparatus comprising:
   a primary digital information recording means for recording the primary digital information by forming pits at discrete reference positions on a track of the optical disc; and
   a secondary digital information recording means for recording the secondary digital information by displacing positions of certain pits by slight amounts from corresponding reference positions;
   wherein each slight amount is within a range where pits on an optical disc on which only the primary digital information is recorded deviate from corresponding reference positions during reproduction;
   wherein said secondary digital information recording means records the secondary digital information with a radial modulation where each certain pit is formed at a position that is displaced by a slight amount either inward or outward from a track center in a radial direction; and
   wherein each slight amount is constant and is within a range of position errors in the radial direction that are observed, during reproduction, for pits on an optical disc on which only the primary digital information is recorded.

18. The recording apparatus of claim 17, wherein the secondary digital information is recorded in a certain area of the optical disc, and
   said secondary digital information recording means performs the radial modulation so that, within the certain area, a total number of pits that are formed at positions displaced inward is substantially equal to a total number of pits that are formed at positions displaced outward.

19. The recording apparatus of claim 18, wherein, within the certain area, said secondary digital information recording means performs a modulation for displacing pits inward and modulation for displacing pits outward for each unit code of the primary digital information with equal probability.

20. The recording apparatus of claim 19, wherein said secondary digital information recording means includes:
a PE modulation unit for generating, according to the secondary digital information, a PE modulation signal that logically inverts at a center of each channel code in a part of the primary digital information to be recorded;
a radial modulation unit for generating a signal for inwardly displacing a position of a beam spot for forming the pits by the slight amounts from a track center when the PE modulation signal shows a first state, and for generating a signal for outwardly displacing the position of the beam spot by the slight amounts from the track center when the PE modulation signal shows a second state; and
a beam deflection unit for displacing the position of the beam spot according to the signals generated by said radial modulation unit.

21. The recording apparatus of claim 20, wherein said secondary digital information recording means further includes:
a random number generating unit for generating a random number series; and
a logic conversion unit for logically converting the random number series according to the secondary digital information;
wherein said PE modulation unit generates the PE modulation signal according to the logically converted random number series.

22. The recording apparatus of claim 17, wherein said secondary digital information recording means further includes:
a random number generating unit for generating a random number series;
a logic conversion unit for logically converting the random number series according to the secondary digital information; and
a PE modulation unit for generating, according to the logically converted number series, a PE modulation signal that logically inverts at a center of each channel code in a part of the primary digital information to be recorded.

23. The recording apparatus of claim 22, wherein said secondary digital information recording means further includes a secondary digital information holding unit for secretly holding the secondary digital information, and
said logic conversion unit sequentially calculates an exclusive OR of a value of each bit composing the secondary digital information held in said secondary digital information holding unit and each part of the random number series having a constant length.

24. A recording method for recording primary digital information and secondary digital information onto an optical disc by embedding the secondary digital information into the primary digital information, said recording method comprising:
recording the primary digital information by forming pits at discrete reference positions on a track of the optical disc; and
recording the secondary digital information by displacing positions of certain pits by slight amounts from corresponding reference positions;
wherein each slight amount is within a range where pits on an optical disc on which only the primary digital information is recorded deviate from corresponding reference positions during reproduction;
wherein, in said recording of the secondary digital information, the secondary digital information is recorded with a phase modulation where edges that determine lengths of the certain pits in a track direction are formed at positions whose phases are advanced and delayed by the slight amounts from corresponding positions when the certain pits are formed to record only the primary digital information; and
wherein each slight amount is constant and is within a range of jitter that is observed, during reproduction, for pits on an optical disc on which only the primary digital information is recorded.

25. A recording method for recording primary digital information and secondary digital information onto an optical disc by embedding the secondary digital information into the primary digital information, said recording method comprising:
recording the primary digital information by forming pits at discrete reference positions on a track of the optical disc; and
recording the secondary digital information by displacing positions of certain pits by slight amounts from corresponding reference positions;
wherein each slight amount is within a range where pits on an optical disc on which only the primary digital information is recorded deviate from corresponding reference positions during reproduction;
wherein, in said recording of the secondary digital information, the secondary digital information is recorded with a radial modulation where each certain pit is formed at a position that is displaced by a slight amount either inward or outward from a track center in a radial direction; and
wherein each slight amount is constant and is within a range of position errors in the radial direction that are observed, during reproduction, for pits on an optical disc on which only the primary digital information is recorded.

* * * * *